United States Patent
Hazenson

(10) Patent No.: US 7,558,242 B1
(45) Date of Patent: Jul. 7, 2009

(54) METHOD OF BUILDING FLEXIBLE AND EFFECTIVE TRANSMISSION SYSTEMS FOR TWO-WAY COMMUNICATIONS

(76) Inventor: Michael Boris. Hazenson, 8554 Burnet Ave., #134, North Hills, CA (US) 91343

( * ) Notice: Subject to any disclaimer, the term of this patent is extended or adjusted under 35 U.S.C. 154(b) by 824 days.

(21) Appl. No.: 10/907,289

(22) Filed: Mar. 28, 2005

(51) Int. Cl.
*H04J 3/00* (2006.01)
*H04J 3/06* (2006.01)

(52) U.S. Cl. ...................................... 370/345; 370/350
(58) Field of Classification Search ................. 370/336, 370/345, 350
See application file for complete search history.

(56) References Cited

U.S. PATENT DOCUMENTS

| | | | | |
|---|---|---|---|---|
| 5,809,092 A * | 9/1998 | Gontsch | ...................... | 375/356 |
| 5,831,974 A * | 11/1998 | Suonvieri | .................... | 370/252 |
| 5,936,962 A * | 8/1999 | Haddock et al. | ............ | 370/446 |
| 5,987,023 A * | 11/1999 | Albrow et al. | .............. | 370/350 |
| 6,016,311 A | 1/2000 | Gilbert | ........................ | 370/280 |
| 6,256,321 B1 * | 7/2001 | Kobayashi | .................. | 370/464 |
| 6,330,230 B1 | 12/2001 | Råsånen | ..................... | 370/280 |
| 6,477,151 B1 * | 11/2002 | Oksala | ........................ | 370/314 |
| 6,549,759 B2 | 4/2003 | Arviv | ........................... | 455/69 |
| 6,570,533 B2 * | 5/2003 | Syrjarinne et al. | ..... | 342/357.12 |
| 6,763,011 B1 * | 7/2004 | Hakkinen et al. | ........... | 370/337 |
| 6,816,818 B2 * | 11/2004 | Wolf et al. | .................. | 702/188 |
| 7,308,005 B1 * | 12/2007 | Roggendorf et al. | ........ | 370/508 |
| 2004/0233874 A1 * | 11/2004 | Baker | ........................ | 370/335 |
| 2005/0018611 A1 * | 1/2005 | Chan et al. | .................. | 370/241 |

OTHER PUBLICATIONS

Warren Hioki, Telecommunications, 1998, Third Edition, pp. 277-278, Prentice-Hall, Inc. Upper Saddle River, USA.
Andrew S. Tanenbaum, Computer Networks, 2002, Fourth Edition, pp. 275-278, Prentice-Hall, Inc., Upper Saddle River, USA.
Roy Blake, Wireless Communications Technology, 2001, pp. 226-228, 235-237, Delmar, Albany, USA.
Roy Blake, Electronic Communication Systems, 2002, pp. 682-683, Delmar, Albany, USA.

* cited by examiner

*Primary Examiner*—Andrew Lee

(57) ABSTRACT

A method of building transmission systems for two-way communications is disclosed. For "point-to-point" transmission system, which structure is shown on FIG. 1, the method provides flexible and effective distribution transmission resources between opposite directions of transmission. Three variations of the method, which time diagrams are shown on FIG. 3, FIG. 16, and FIG. 18, are disclosed. Each of them has its field of application. The method is disclosed and can be implemented in time and code domains. For "point-to-multipoint" transmission systems, which structure is shown on FIG. 20 and which can be represented as a plurality of "point-to-point" transmission systems, this method can be applied to every "point-to-point" system independently. Distribution of transmission resources between opposite directions can be accomplished using time or code division multiplexing. So build "point-to-multipoint" system provides an ability of flexible and effective distribution transmission resources both among simultaneously established connections and between opposite directions inside each connection.

8 Claims, 20 Drawing Sheets

Tsq - sequence of signals used for measurement Tpr
Td - time interval with known length
Tpr - the propagation time of the transmission system
Tsw - time of switching direction of transmission Tpd - time interval used to send pad signals
Ts - time between moments when transceiver from A sent bit P to B and received it back
P - special bit inside of sequence sent between A and B that used to turn on and off timers on both sides of transmission system

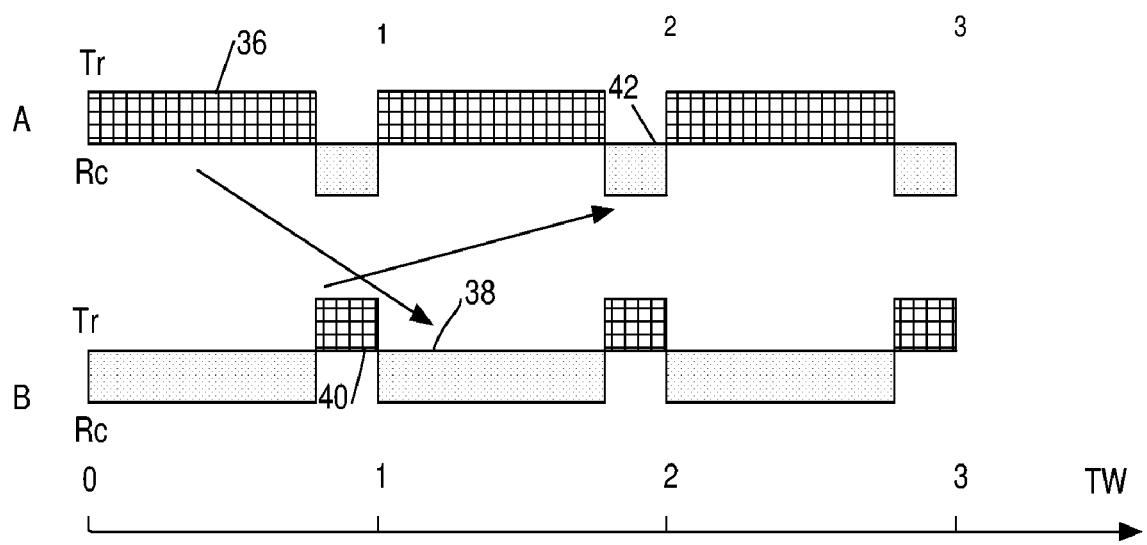
 - Sub TWs of transmission, Tr ⟶ - Indicats direction of transmition sub TWs on sides A and B of transmission systen
 - Sub TWs of reception, Rc
FIG. 3

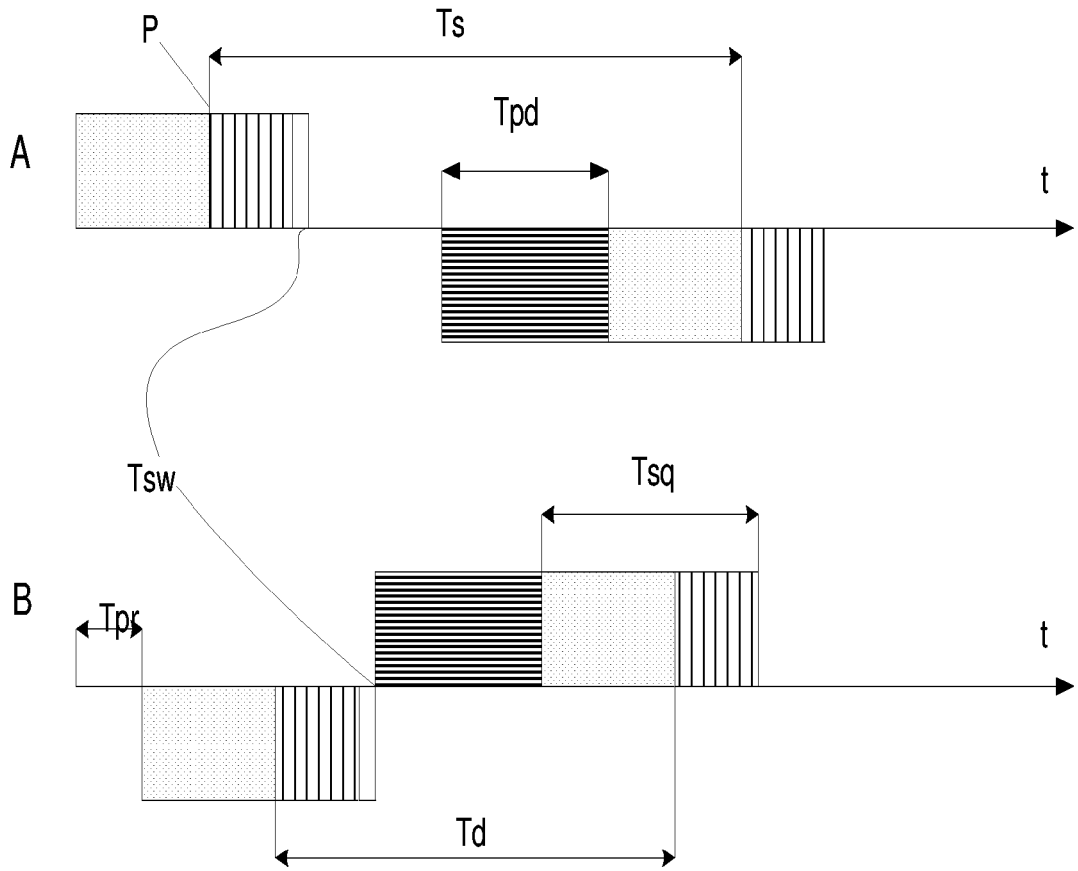

Tsq - sequence of signals used for measurement Tpr

Td - time interval with known length
Tpr - the propagation time of the transmission system
Tsw - time of switching direction of transmission Tpd - time interval used to send pad signals Ts - time between moments when transceiver from A sent bit P to B and received it back P - special bit inside of sequence sent between A and B that used to turn on and off timers on both sides of transmission system

FIG. 4

FIG. 7
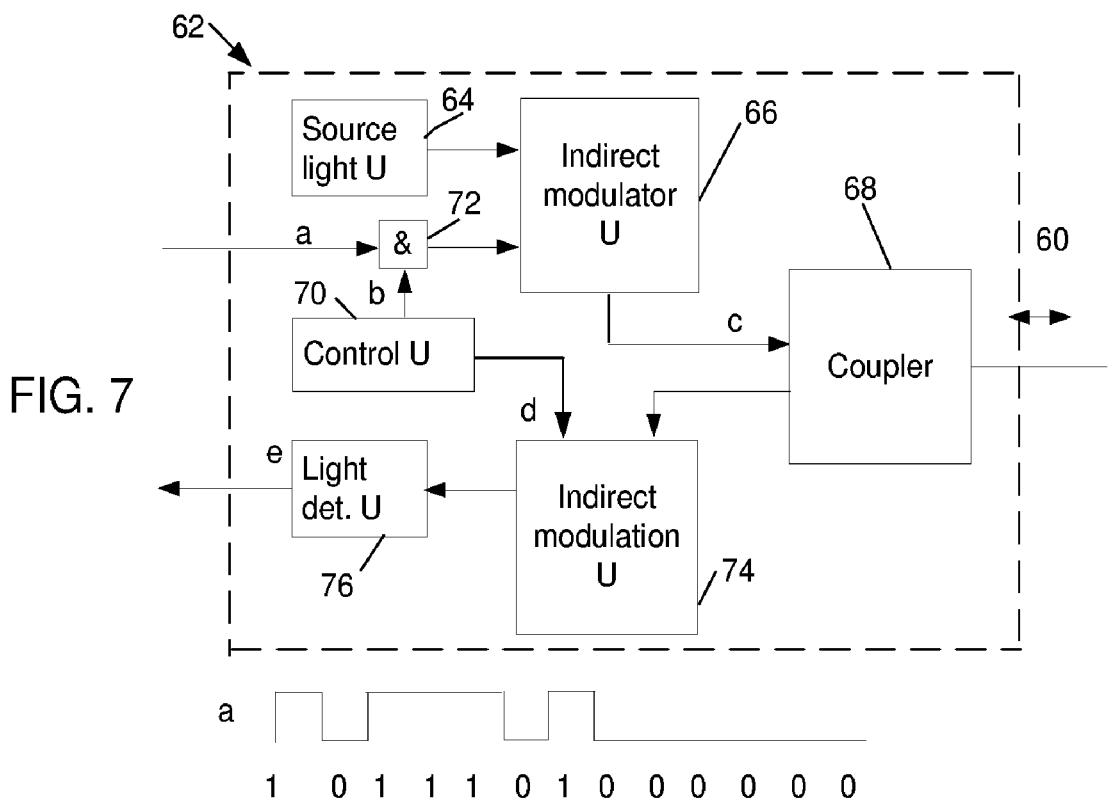
FIG. 8
a
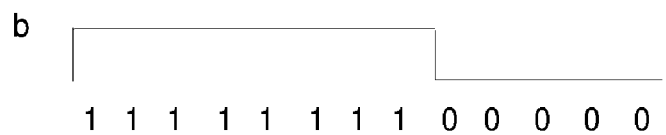
1   0  1  1  1   0  1  0   0  0  0  0
b
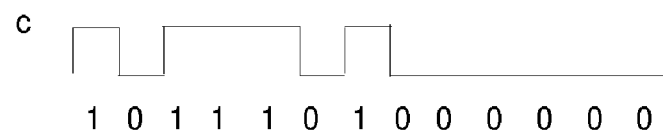
1   1  1  1  1   1  1  1   0  0  0  0
c
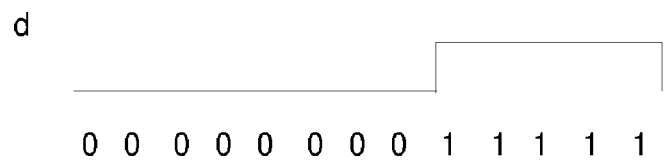
1   0  1  1  1   0  1  0   0  0  0  0
d
0   0  0  0  0   0  0  0   1  1  1  1
e
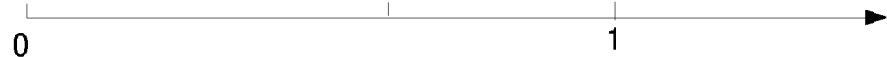
                            1  1  0  0  1
         Transmission    Reception
         sub TW          sub TW           TW
0                                    1

Where: L1, L2, L3 - distances to the Base station from correspondents
N1, N2, N3 - number of bits transmitted in every Cl1, Cl2, Cl3
V1, V2, V3 - transmission rates during Cl1, Cl2, Cl3
T1, T2, T3 - length of Cl1, Cl2, Cl3

METHOD OF BUILDING FLEXIBLE AND EFFECTIVE TRANSMISSION SYSTEMS FOR TWO-WAY COMMUNICATIONS

BACKGROUND OF INVENTION

1. Field of Invention

This invention relates to the field of telecommunication, specifically to methods of building transmission systems.

2. Prior Art

One direction of improvement telecommunication systems is the development of methods of building transmission systems, which provide high level of utilization their transmission resources, especially for transmission of discontinuous, burst traffic created by plurality of simultaneously working sources of information. The most effective method used now for this purpose is statistical multiplexing. High efficiency of statistical multiplexing is achieved because of several features that distinguish it from other methods of multiplexing such as Time Division Multiplexing and Frequency Division Multiplexing. These features are:

Data presented as frames, packets, datagrams, or cells are transmitted through the transmission system at maximum transmission rate. This is why the statistical multiplexing has the shortest transmission time in contrast to other methods, where the frames are transferred using only part of transmission system's resources (time, frequency, and wavelength), Every frame uses all transmission resources of transmission system but only for the time that is necessary for transmission. All other time the transmission resources are available for transmission of frames belonging to other messages. As a result, the transmission resources of the transmission system are distributed among frames coming simultaneously for transmission in the same direction in proportion to frames volumes. All other methods of multiplexing usually assign for every of simultaneously transferred frames only part of transmission resources. These provide in case of statistical multiplexing lowest than for other methods of multiplexing average time that the frame spends in the transmission system. This average time includes an average time of waiting transmission and an average time of transmission frames, Depending on the requirements, every frame can be served with a different quality of service by applying to them different priorities.

Most transmission systems provide two-way communications by using two separate channels with equal bandwidth, each carrying data in one direction only. Applying statistical multiplexing for distribution transmission resources among streams of data sent in one direction to every channel independently allows achievement of high quality of service and high level of utilization of transmission resources in every direction of transmission. However, when the system is working, every moment it sends different volume of data in opposite directions and, as a result, provides different quality of service for data sent in opposite directions. In these systems, every channel in some periods can be overloaded, whereas the channel, which sends data in the opposite direction, in these periods can be empty, waiting for data.

Another problem that exists in every telecommunication network is associated with the fact that the resources necessary for transmission of data through every transmission line are determined at the period with the highest volume of traffic called the pick or rush hour. The time when the volume of traffic is high has usually length several hours a day only. At all other times less traffic is coming. As a result, the utilization of resources of transmission systems is low and unneeded consumption of energy takes place too.

At present, there are several know cases, where the same channel is used to carry signals in opposite directions simultaneously. One of them was developed and implemented in so-called local loops of public telephone networks, where for two-way voice and data transmission between a telephone set and a nearest central office one pair of copper cable is used. In this case, no sharing and possibility of distributing resources between opposite directions take place. Two electrical signals with similar features, sent simultaneously through one common channel but in opposite directions, do not interfere within the channel. The receivers receive them on the opposite sides of the channel without corruption (see Warren Hioki, Telecommunications, $3^{rd}$ edition, 1998, pp 277-278). Another example, when one channel is used for sequential transmission of signals in opposite directions is half-duplex mode. In this mode every side of transmission system in turn get right to send waiting in buffer memory data and after this, transfer the right to send data to opposite side of transmission system. In the radio systems, the half-duplex mode allows using only one frequency for two-way communications. The half-duplex mode possesses two important futures. First, half-duplex mode uses one common channel for transmission in opposite directions. Second, distribution of transmission resources of the common channel depends on the volumes of traffic sent in opposite directions. This determines high flexibility of half-duplex mode. Half-duplex mode and statistical multiplexing have some common futures such as:

In both cases is used maximum transmission rate for transmission of every frame, The time, for which frames of data use the transmission resources, depend on their volumes.

However, the statistical multiplexing and half-duplex mode also have one significant difference. In half-duplex mode, the resources are distributed between opposite directions. There are several downsides in the half-duplex mode such as the time of propagation of signals, switching time and times for reestablishing of bit synchronization for every change in direction of transmission. These components are the cause of loss efficiency for the half-duplex mode.

For better understanding peculiarities of half-duplex mode, on FIG. 1 is shown the structure of "point-to-point" transmission system that includes two similar transceivers 30 and 32 working in half-duplex mode and transmission media 34 that connects the transceivers and used for transmission signals between them. On FIG. 2 is depicted a time diagram of operation each transceiver. The time diagram shows a chain of periodically repeating sequence of operations. Every of them include transmission of data, propagation of data to opposite side, switching from reception to transmission on the opposite side, propagation of data from opposite side, reception of data, switching transceiver from reception to transmission. Combination of the propagation times, the switching times and, not shown on FIG. 2, times for reestablishing bit synchronization after every change of direction of transmission represent losses of efficiency half-duplex transmission systems. As can be seen from FIG. 2, the efficiency of the system depends on the combined times of transmission and reception for the same values of propagation and switching times. The bigger they are, the higher the efficiency of transmission system working in half-duplex mode. However, with the growth of transmission and reception times, the delay in data transmission will grow too. Because of this, fewer types of traffic can be sent through this transmission system since some types of traffic are not compatible with the increase and variations in delay. This is especially true about traffic that requires transmission in real time. Half-duplex mode cannot be effectively used for transmission of integrated traffic, because combined transmission and reception times have to be short for transmission of integrated traffic.

For some types of transmission systems, designers developed ways of improving efficiency in transmission systems while keeping their flexibility high. One example of the transmission system is GSM (Global System for Mobil communications) cellular system. There the time intervals of transmission and reception for every pair "base station—user station" are separated by the time intervals of communication between base station and others user stations. As a result, the loss in efficiency due to propagation and switching times are decreased.

Developers of the well-known LAN technology Ethernet considered the possibility that two transceivers without corruption can receive two signals sent through common transmission media by them and the fact of simultaneous transmission can be unrecognized. Because this is not acceptable for Ethernet technology, which used half-duplex mode, the developers established interdependency among values of 3 parameters of the system: the maximal length of cable, the minimal number of bits in frame, and the transmission rate. This allowed to ensure the 100% recognition of collisions in case of simultaneous transmission frames by two terminals (see Andrew S Tanenbaum, Computer Networks, 4th edition, 2002, pp 275-278). This technology allows easy and flexibly distribute transmission resources of the transmission system among connected terminals depending on their loads. However, in this case the efficiency transmission is low.

Within recent years, many solutions were developed that offer improvement of flexibility and efficiency mostly cellular or fiber optic transmission systems. However, no one of them offers a universal way of building effective and in the same time flexible transmission systems.

OBJECTS AND ADVANTAGES

The object of present invention is to develop a method of building flexible and effective transmission systems that use common transmission resources for transferring integrated traffic. This invention discloses the method that:

Can be used for long and short haul transmission systems; for copper cable, fiber optic cable, for wireless, including terrestrial and satellite microwaves, cellular and PCS systems, and short-wave lines, Can be used to rapidly redistribute available transmission resources between opposite directions of transmission with an ability to control the direction of transmission for every bit, Can be implemented in both the time and the code domains, Can eliminate the loss of efficiency due to the propagation time, the switching time, and the need for reestablishing the bit synchronization every time when the direction of transmission is changed, Can support transmission rate for every transmission system depending on the type and length of transmission line, and the level of noise.

When implemented, the method will provide the following advantages over current transmission methods:

Free a part of frequency ranges currently used for two-way communications, pairs in copper cables and fibers or wavelengths in optical cables, Reduce the consumption of the energy by using only a part of the transmission resources any time except the busy hours, Increase a dynamic range of loads sent in any direction by putting limitations on a sum of sent in both directions loads but not on the load sent in each direction separately, Decrease both the average time data spend in the transmission system and the influence that the law of distribution the size of transmitted data exerts on the average time, Improve the reliability of transmission systems, Measure the length of the transmission path, simultaneously with transmission data, Improve the protection of data sent through the transmission system against eavesdropping.

All these advantages are represented components of the efficiency of disclosed method and are achieved substantially because of its high flexibility.

SUMMARY OF INVENTION

The present invention has its purpose to develop the method of building transmission systems that allow flexibly, effectively, and promptly responding to the changes of conditions of data transmission. These conditions include changes in the loads, in the propagation of signals, and in the level of noise.

As was discussed earlier, the half-duplex mode, which with some changes successfully used in such network technologies as Ethernet, Token Ring and others, can be considered as a basic for development the new method of transmission too. The half-duplex mode allows distribution of the transmission resources depending on the loads coming from the opposite directions. However, its efficiency depends on the number of changes directions of transmission: the more changes the lower the efficiency. Every time when the change of direction takes place the time is wasted due to propagation, switching transceivers, and reestablishing the bit synchronization for transmission in new direction.

By finding a way allowing to avoid loss of the efficiency during changes of direction of transmission, the method of flexible and effective transmission is created. It allows any number of changes the directions of transmission without loss of the efficiency. Also technical solutions are developed that altogether allow implementing disclosed method in the wire-based (fiber optic and copper) and wireless transmission systems.

In developed method the representation of transceivers' operation time as sequences of time intervals, called here Time Windows (TWs) plays important role; the length of each TW is equal to the line's propagation time. By using this representation, it has become easy to synchronize the transmission and reception of data on opposite sides of transmission line and distribute the transmission resources between opposite directions.

The method can work on short-haul (local loops, wireless local loop (WLL), cellular and PCS lines and long haul (satellite, microwave, and fiber optic) lines. In present invention described three variations of the method that are suitable for different applications.

Foe disclosed method are developed several procedures of distribution the transmission resources between the opposite directions. As calculations shown, for comparable transmission resources and the same loads developed method has better performance, bigger range of loads sent in one direction, and helps weaken dependency the performance from law of distribution the volume of transmitted data.

Developed method can work in both time and code domains, providing in both cases flexible distribution transmission resources.

The method developed for point-to-point transmission systems; however, in some cases the method will work for three connected by common line terminals. In addition, a repeater can be installed in the middle of the transmission line to increase the length of the transmission line.

The method extended also to work in case of point-to-multipoint transmission systems.

For some applications, it may be useful that the method allows measuring the length of the transmission line.

Moreover, because in this method signals are sent simultaneously in opposite directions, almost everywhere it will be interference and this can be considered as an additional protection against eavesdropping information by third party.

BRIEF DESCRIPTION OF THE DRAWINGS

In the drawings, closely related figures have the same numbers but different alphabetic suffixes.

FIG. 3 shows a time diagram of "point-to-point" transmission system operating using disclosed in the main embodiment of the method.

FIG. 4 shows a time diagram of a process of discovering an approximation of the propagation time of the transmission line.

FIG. 7 shows a simplified block diagram of a transceiver operating using disclosed in the main embodiment variation of the method that allows eliminating the switching time in case of fiber optic transmission line.

FIG. 8 shows a time diagram of operation of the transceiver that block diagram is shown on FIG. 7.

DETAILED DESCRIPTION

Through this description, given embodiments and technical solutions should be considered as exemplars, rather than as limitations on the present invention. The scope of the present invention should be determined by the appended claims and their legal equivalents, rather than by exemplars given.

FIGS. 1, 3-15

Preferred Embodiment

Figure 1:
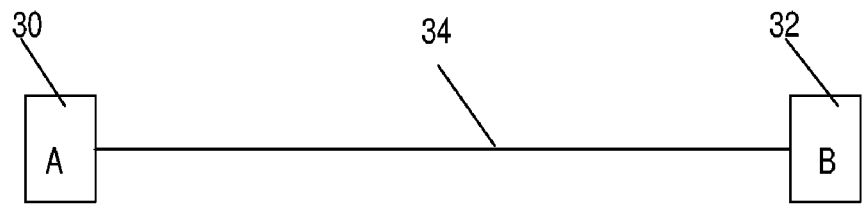
FIG. 1 shows a block diagram of "point-to-point" transmission system used common channel for two-way communications.
Figure 2:
FIG. 2 shows a time diagram of "point-to-point" transmission system operating in half-duplex mode.

The structure diagram of "point-to-point" transmission system, for which present invention is disclosed, is depicted on FIG. 1 and is the same as for "point-to-point" systems operating in half-duplex mode. As shown on FIG the transmission system consists of two identical transceivers 30, 32, and transmission media 34 that connects the transceivers. Both transceivers send and receive signals to and from each other according to described below method.

To achieve its objective the present invention offers a method that, base on the known use of half-duplex mode in different transmission technologies, allows to resolve three following problems:

Eliminate the influence given by signal's propagation time on the efficiency of the transmission system, Reduce to zero transceiver's switching time from transmission to reception and vice versa, Create bit synchronization insensitive to changes in direction of transmission and to variations of propagation time.

Propagation Time

The solution of the first problem is based on the fact that two signal with similar characteristics sent through a common channel by transceivers 30 and 32 simultaneously can be received on opposite sides without corruptions. Using this every transceiver 30 and 32 can transmit data through transmission media 34 any time except the time of reception data sent by the other transceiver. The data send by both transceivers propagate through the transmission media simultaneously, but when the propagated from opposite side signals approach transceiver it has to stop transmission and be ready to receive incoming data. After receiving data, transceiver can resume transmission. The only task that has to be solved is to prevent periods of transmission and reception against overlapping.

The overlapping can be avoid if the time of operations of each transceiver 30 and 32 is represented as an infinite sequence of intervals, which lengths equal to the time of propagation signals in the transmission line. This interval is called here a Time Window (TW). Two transceivers synchronize their sequences of TWs by establishing the coincidence of beginning TWs. In this case when the time of operation in each transceiver is represented by the sequence of TWs and two sequences of TWs are synchronized, it is easy to avoid overlapping the transmission and the reception intervals. For this purpose every TW is divided into several disjoint intervals every of which can be assigned for transmission or reception data. For every interval used to send data by one transceiver, the other transceiver creates the interval, which used for reception the data. These two intervals have the same positioning inside their TWs, however, the transmission is accomplished in TW N of one sequence but the reception is accomplished in TW N+1 of the other sequence.

To avoid overlapping, it is necessary to divide identically every TW of both sequences into plurality disjoint intervals, which called here sub TW, and for every sub TW assigned for transmission in on sequence the same sub TW to assign for reception in the next TW of the other sequence.

FIG. 3 shows the time diagram that illustrates an order of transmission and reception data organized in two synchronized sequences of sub TWs. On FIG TW1 includes two sub TWs on both sides. Sub TW 36 is used for transmission data from side A to side B. Data transmitted in this sub TW are received in sub TW 38 on the side B with delay equal to the propagation time. Data sent from side B in sub TW 40 of TW 1 are received on the side A in sub TW 42 of TW 2. Here on both sides of the transmission system after the transceiver finishes sending data during one sub TW, it starts immediately reception data coming during the next sub TW. In contrast to transmission systems working in half-duplex mode, the transceivers here after they finish transmission data do not waste time for waiting when the data sent from the opposite side come.

In general, some sub TWs can be free from transmission or reception data. Also on FIG. 3 the switching times are not shown because below will be described ways to reduce the switching times to zero. However, in case if switching time is not zero, the number of bits sent and received in every sub TW have to be decreased by the number of bits that can be transmitted for interval equal to the switching time.

Described here solution allows to use the transmission resources of the system better, performing reception of incoming data immediately after finishing transmission and vice versa.

By changing inside TWs ratio between lengths of sub TWs used for transmission data in opposite directions, transmission resources of the system can be redistributed.

For described solution, it is important to underline relations between sub TWs and TWs of two sequences used on both sides of transmission system, which include:

Beginnings of TWs on both sides coincide in time.

Lengths and positions relative to the beginning of TW N of its sub TWs used for transmission by one transceiver have to coincide with lengths and positions relative to the beginning of TW N+1 of its sub TWs used for reception by other transceiver.

Lengths and positions relative to the beginning of TW N of its sub TWs used for reception by one transceiver has to coincide with lengths and positions about the beginning of the TW N−1 of its sub TWs used for transmission by second transceiver.

There are two options of assigning sub TWs inside TWs, which both support described relations. One option is, to have one pattern of allocation sub TWs for all TWs that belong to one sequence. The other option is, to have two patterns of allocations sub TWs for every sequence, one for odd TWs and the other for even. The first option is disclosed in the main embodiment, and the second—in the first additional embodiment of present invention.

The number of bits that the transceivers can send in one TW is in wide range from several bits to several millions bit. For short-haul transmission systems for copper cable lines, which lengths are in range from 1 to 8 km, and for T1 transmission rate (1.544 Mbps), the number of bits per TW is in range from 9.33 to 78.7. For terrestrial microwave transmission systems, which lengths are in range from 5 to 50 km, and for T1 transmission rate, the number of bits per TW is in range from 25.8 to 258.

For fiber optic system, which length is 75 km, and for T3 transmission rate (44.736 Mbps), the number of bits per TW is 16,273. For satellite microwave systems, which lengths are in range from 1,500 to 36,000 km, and for T3 transmission rate, the number of bits per TW is in range from 223,680 to 5,368,320.

For long haul satellite, fiber optic, and microwave transmission systems, it makes sense to divide TW more than into two sub TWs. This helps decrease both delays of transmission data and sizes of transceivers' buffer memory. However, an increase of the number of sub TWs leads to proportional rising of numbers of changes directions of transmission and associated with this reduction of efficiency. Without elimination of other causes of wasting time, increased numbers of sub TWs, as a result, will have lower efficiency of transmission data. Presence of the switching time will also make the synchronization transceivers more complicated.

Synchronization

To work properly transmission system built, using described in present invention method, has to support both the TWs synchronization and the bit synchronization. The TWs synchronization assumes keeping equal length of TWs on both sides and supporting simultaneous beginning of TWs by both transceivers. Before starting send information, the transceivers have to establish TWs synchronization and maintain it permanently. The task of establishing and maintaining the TWs synchronization can be solved in several different ways.

One of them illustrated by FIG. 4 is disclosed here. After turning on the transceiver on the side A of the transmission system, it tries receiving predetermined sequence of signals from the transceiver in side B. If it did not receive expected signals for predefined time, it starts sending signals in predetermined sequence to side B for predetermined interval (Tsq) and after this switches itself in reception mode. This sequence of transmission and reception intervals continues until the transceiver receives predetermined sequence signals back. At this time, transceiver works in half-duplex mode. The predetermined sequence includes one bit (P) that used as special mark. On the transmission side A the transceiver starts timer that will measure the time (Ts). This time it takes to send bit P to side B, keep it there predetermined time (Td), and send it back. With known Ts, it is easy to find an estimation of propagation time as Tpr=(Ts−Td)/2. On the reception side B the transceiver, after receiving bit P, also turns on its timer and starts counting time until it becomes equal known on both sides value Td. The transceiver on side B after receiving the sequence of signals from side A, switches itself to the transmission mode and starts sending pad signals for some period of time (Tpd). After this transceiver sends back, received from the transceiver on side A, sequence of signals. The length of the interval Tpd, is chosen so the transceiver on side B sends back the bit P of the sequence within interval Td after reception it on side B. One of advantages of this solution is the elimination a switching time from the procedure of measurement the propagation time.

This estimation of the propagation time the transceivers use to determine an area of transmission rates for the transmission system. By measuring likelihood of error and comparing it with required value, the transceivers find out more accurately the value of transmission rate.

After these procedures, the transceiver on side A sends to side B special signal to switch from half-duplex mode the method disclosed in present invention. After these, the transceivers send to each other sequences of periods, which lengths are equal to the estimated value of propagation time. During first half of every TW, transceiver on side A sends signals and for second half of every TW it tries to receive signals from the opposite side. On side B the transceiver receives predetermined signals from side A and after receiving, immediately sends them back. This exchange allows to adjust the measured value of propagation time. If the overlapping between sent and received signals in the moments of changing direction of transmission takes place, the transceivers decrease length of TWs. In opposite case, when the gap between received and transmitted signals is recognized, the transceivers increase length of TW. After several iterations, the value of TW can be determined with required accuracy. The transceivers use the same procedure of adjustment, when the variations of the propagation time take place.

After the transceivers established TW synchronization, they use it for establishing the bit synchronization by tying the bit synchronization to the already synchronized sequences of TWs on both sides of transmission line. The transceivers change the transmission rate until they transmit in every TW integer number of bits. This allows keeping the bit synchronization stable and insensitive to changes of the direction of transmission. When the transceivers divide TWs into sub TWs, they choose the length of every sub TW that they include integer numbers of bit intervals. It is important to notice that the requirement to have integer number of bits in any sub TW does not call for equal transmission rate in both directions. At least the possibility exists to use different bit rates for transmission in opposite directions since the difference in conditions of reception signals on the opposite sides of the transmission line is feasible. This will make it possible to work in every direction on its highest transmission rate and, by doing so, improve the performance of the transmission system. Tying the bit synchronization to TW synchronization gives some another advantage. When gradual changes of the propagation time take place, every transceiver can recognize this by presence either small overlapping bits during switching from reception to transmission or by small gap between received and sent bits. The transceivers on both sides use this information for proper adjustment of the length of TW. To keep in this case the bit synchronization, the transceivers leave the same number of bits in every sub TW after adjustment the length of TW. Because of the adjustment, the transceivers slightly change the transmission rate, but system will keep bit synchronization despite of changes of the propagation time.

Switching Time

The third component, which together with the propagation time and the bit synchronization influences achievable level of both the flexibility and the efficiency of the transmission systems, is the switching time. Bringing the value of switching time to zero is the condition of building the transmission system with characteristics that is good for many applications today and will be good in the future. Technical solutions that allow cutting out the switching time depend on transmission media. For three different transmission media: one—for copper cable, second—for optical fiber, and third—for wireless transmission media the technical solutions allowing solve the problem are described possible below. The approach allows bringing the switching time to zero, is to choose technical solutions that use the absence of signal in transmission media to represent some values of transmitted data. Than the transition time from and to this signal and other used for transmission data signals will be as small as the transition time between any other signals used in the transmission system. In this case, during the sub TWs of reception control signals will bring and keep the value of transmitted signal equal zero. Here switching time will have value of the transition time between adjacent signals during transmission sub TWs.

Figure 5:
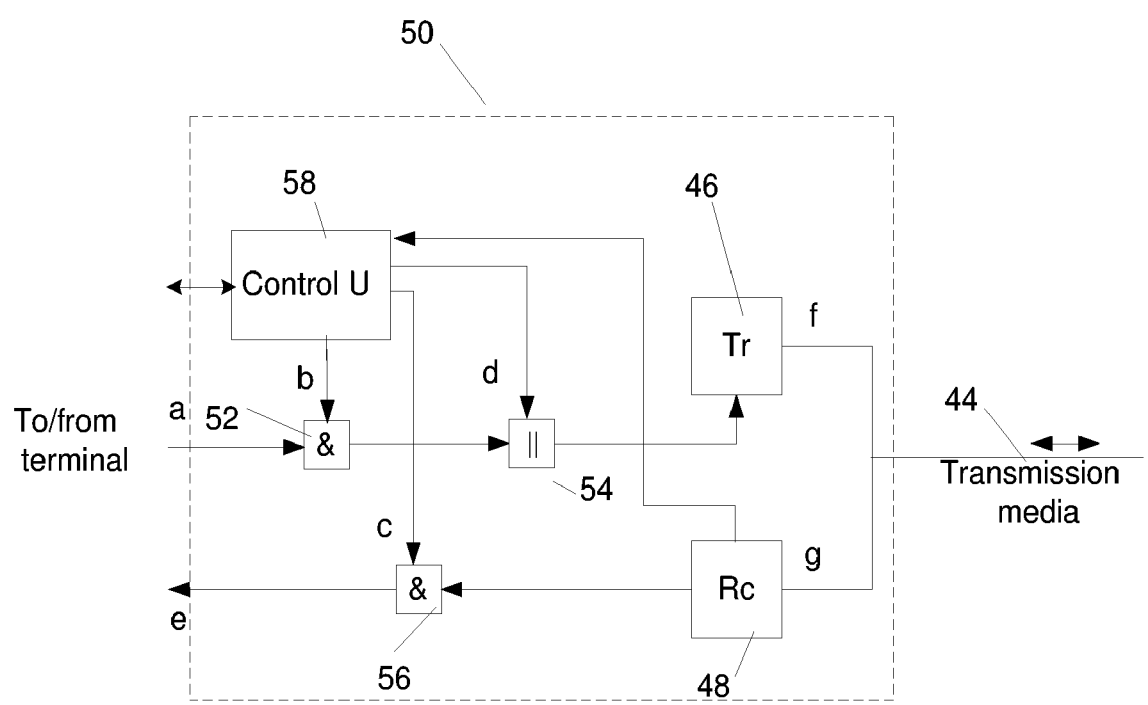
FIG. 5 shows a simplified block diagram of a transceiver operating using disclosed in the main embodiment variation of the method that allows eliminating the switching time in case of copper cable transmission line.

In case of the copper cable, the solution is to apply, for example, the linear code called Multiple Level Transition-3 (MLT-3). This code used three values of signal's voltage: +V, −V, and 0. The transition between these values takes place every time when the value of transmitted data is one. The changes of voltage can be only in predetermined sequence: +V to 0, 0 to −V, −V to 0, and 0 to +V. During sub TWs of reception, control unit responsible for switching between sub TWs will control values of outgoing from transceiver MLT-3 code. In case of MLT-3 code, it is easy to transit the outgoing signal and keep it equal zero during all sub TWs of reception. If the last sent during some transmission sub TW signal had value 0, control unit sends signal equal 0 during sub TW of reception. Otherwise, it sends one control signal equal one and after—all zeros during sub TW of reception. During sub TWs of transmission, the transferred data control values of MLT-3 code. The control unit controls reception data also. During transmission sub TWs, this unit locks the receiver and during reception sub TWs unlocks it, and the transceiver sends data to connected equipment. FIG. 5 shows the simplified block diagram of the transceiver. Here transceiver 50 connected from one side to terminal with two lines: for receiving data from and sending data to the terminal. From the other side the transceiver connected to one pair of copper cable 44. This pair connected simultaneously to transmitting unit of transceiver 46 and receiving unit of transceiver 48. Control unit 58, among other tasks, is responsible for TW synchronization and for timely transition between sub TWs. Logical AND unit 52 opens the transition incoming data to transmitter 46 during sub TWs of transmission and blocks it all other time. Logical AND unit 56 opens transition received from receiver 48 data to the connected terminal. Logical OR unit 54 serves to give the control unit 58 the possibility to bring transceiver 46 to the condition when it sends only zeros during reception sub TWs.

Figure 6:
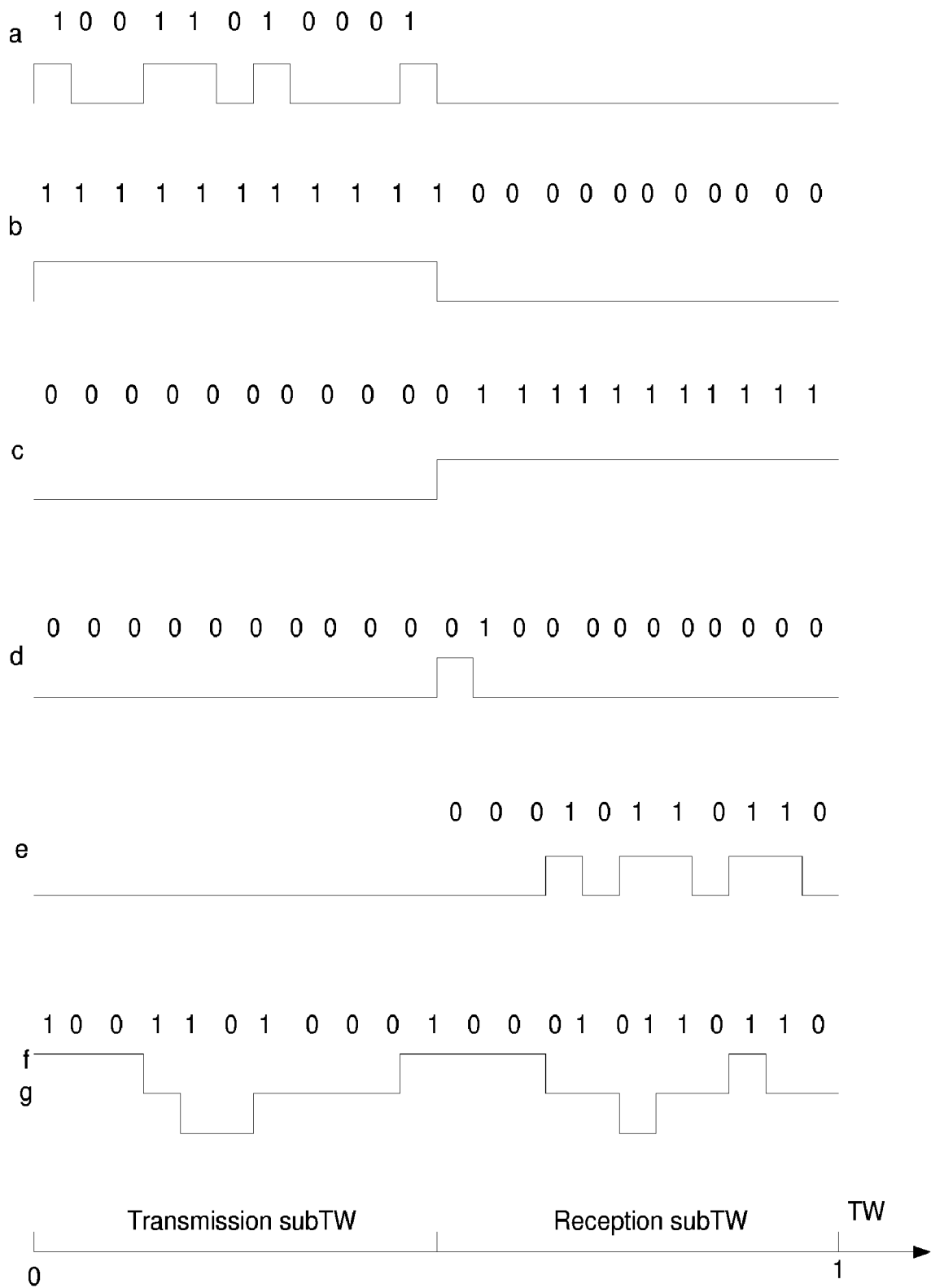
FIG. 6 shows a time diagram of operation of the transceiver that block diagram is shown on FIG. 5.

For described block diagram, FIG. 6 shows the time diagram that explains reception (during sub TW of reception) and transmission (during sub TW of transmission) data with switching time equal zero. This FIG depicts signals in several points inside transceiver 50:

a—shows incoming from terminal signals (point a), which go to the transceiver only during transmission sub TWs, b—shows signals, coming from the Control unit 58 to logical AND unit 52 (point b) to permit incoming from terminal signals go to Transmission unit 46 during transmission sub TWs and prohibit it all other time, c—shows signals coming from the Control unit 58 to logical AND unit 56 (point c) to permit send signals from Reception unit 48 to the terminal only during the reception sub TWs, d—shows signals sent from the Control unit 58 to logical OR unit 54 (point d) to bring to zero the value of outgoing from the Transmission unit 46 signal during the reception sub TWs, e—shows signals sent from transceiver 50 to the terminal (point e), f—show, represented by MLT-3 code, the sequence of signals on the end of transmission line 44, which consist of sent from transceiver 50 signals during the transmission sub TWs (point f) and received by it signals during the reception sub TW (point g).

From FIG. 6 it is clear the time between the last bit transmitted and first bit received is the same as between two adjacent bits in transmitted or received sequences and consequently for every switching of direction of transmission for this transceiver the switching time is equal zero.

FIG. 7 shows simplified block diagram of transceiver in case of optical fiber transmission media. Here to lock the transmission signals during sub TWs of reception, Control unit 70 sends a lock signal to Indirect modulator 66. This brings optical signal generated by Source of light 64 to its lower value and keeps the value during sub TWs of reception. Coupler 68 will protect Light detector 76 from signals sent by Transceiver 62 to the opposite side during sub TWs of transmission and transfer signals coming from optical cable 60 to Light detector 76 during sub TW of reception. Placing an extra Indirect modulator 74 between Coupler 68 and the Light detector 76 and putting it in low transparency position can enforce the protection the Light detector 76 during sub TWs of transmission.

For described here case of fiber optic transmission media, on FIG. 8 is shown the time diagram that illustrates the reception (during sub TWs of reception) and the transmission (during sub TWs of transmission) data with switching time equal zero. The figure depicts time diagram of flow signals in several points of transceiver 62:

a—shows incoming from terminal electrical signals (point a), which go to the transceiver only during transmission sub TWs, b—shows electrical signals, coming from the Control unit 70 to logical AND unit 72 (point b) to allow incoming from terminal signals go to Indirect modulator unit 66 during transmission sub TWs and to forbid them go all other time, c—shows optical signals coming from the Indirect modulator unit 66 to Coupler 68 (point c), d—shows electrical signals sent from Control unit 70 to Indirect Modulator 74 (point d) to lock Light detector 76 during sub TWs of transmission, e—shows electrical signal from Light detector 76 (point e). Switching Transceiver 62 between transmission and reception modes takes the same time as it takes for transition between sequential signals that transceiver send or receive and the switching time in this case can be considered equal zero.

Figure 9:
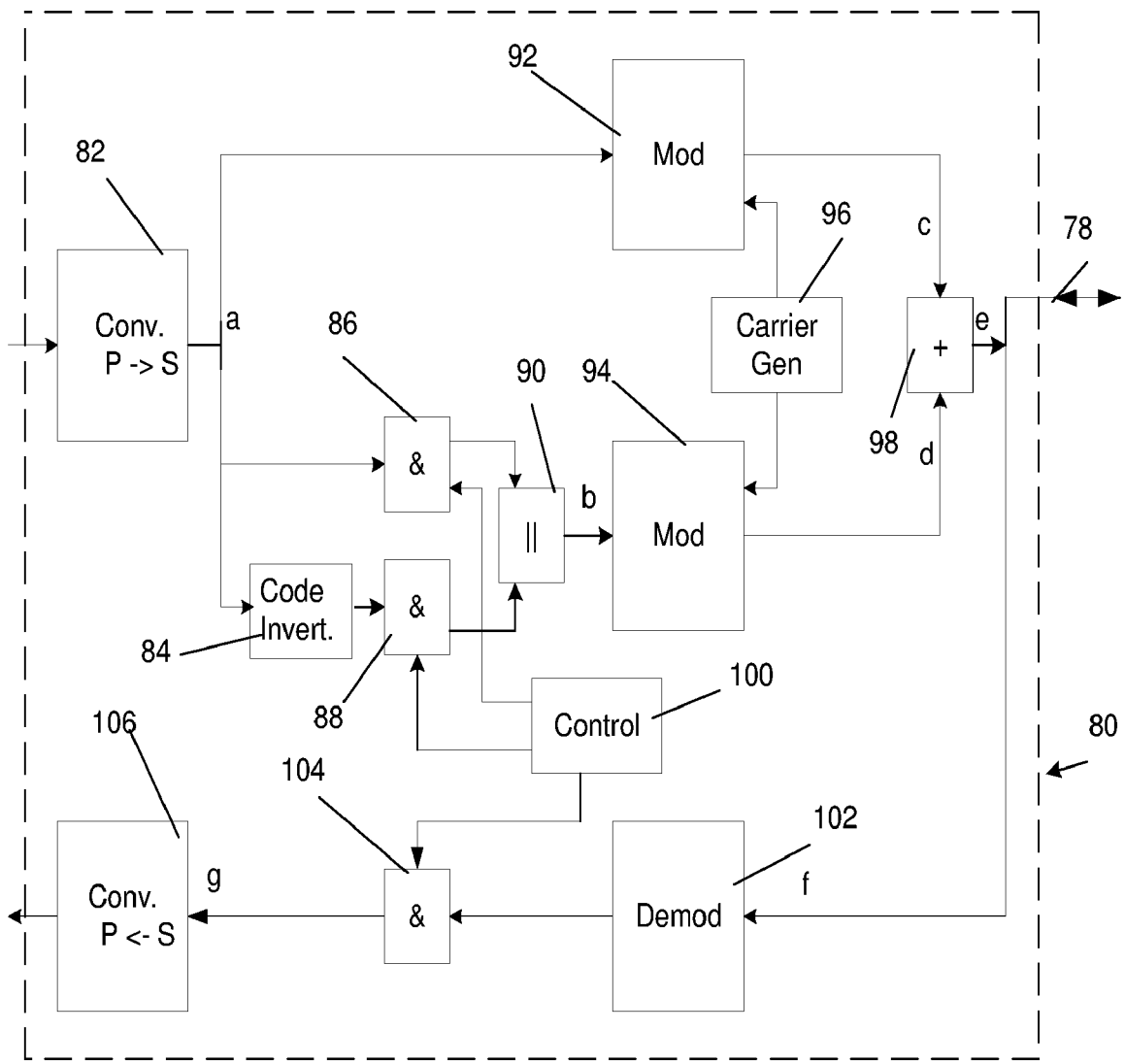
FIG. 9 shows a simplified block diagram of a transceiver operating using disclosed in the main embodiment variation of the method that allows eliminating the switching time in case of wireless transmission line.

In case of the wireless transmission systems, to achieve value of switching time zero one of possible ways is to create transceiver with transmitting part consisting of two identical units. The signal sent by transceiver will be equal to a sum of two signals produced by these two units during sub TWs of transmission and to their difference (that equal zero) during sub TWs of reception. FIG. 9 represents the simplified block diagram of transceiver 80. Converter 82 transforms incoming binary signal from parallel to serial form and divides it into code groups. Every group controls parameters of outgoing from Modulator 92 signals. Depending on used modulation, controlled parameters can include amplitude, phase and frequency of carrier signal produced by Carrier Generator 96, and the size of the group lies usually in range from 1 to 8 bits. These groups are coming in the same time to the logical AND unit 86 and also—to a unit 84. Unit 84 inverts uniquely every group into other group that create after passing modulator 94 carrier signals that differ from the signals modulated in the Modulator 92 in phase on 180°. During sub TWs of transmission, these two signals have same amplitudes, frequencies and phases and because of this, the outgoing signals have two times bigger amplitudes. During sub TWs of reception these two signals have same amplitudes and frequencies but 180° difference in phases. Because of this, the outgoing signals have the amplitude equal zero. The outgoing from Modulator 94 signals controlled by the Control unit 100, two logical AND units 86 and 88, and logical OR unit 90. Adder 98 combines signals from Modulators 102 and 104 and sends them to Antenna 78. Antenna broadcasts and receives radio signals during different sub TWs. Demodulator 102 permanently receives signals coming on its input port but its output signal passes the logical AND unit 104 only during sub TWs of reception. The unit 104 works under control of Control unit 100. Converter 106 transforms data from serial to parallel form and sends it to connected equipment.

Figure 10:
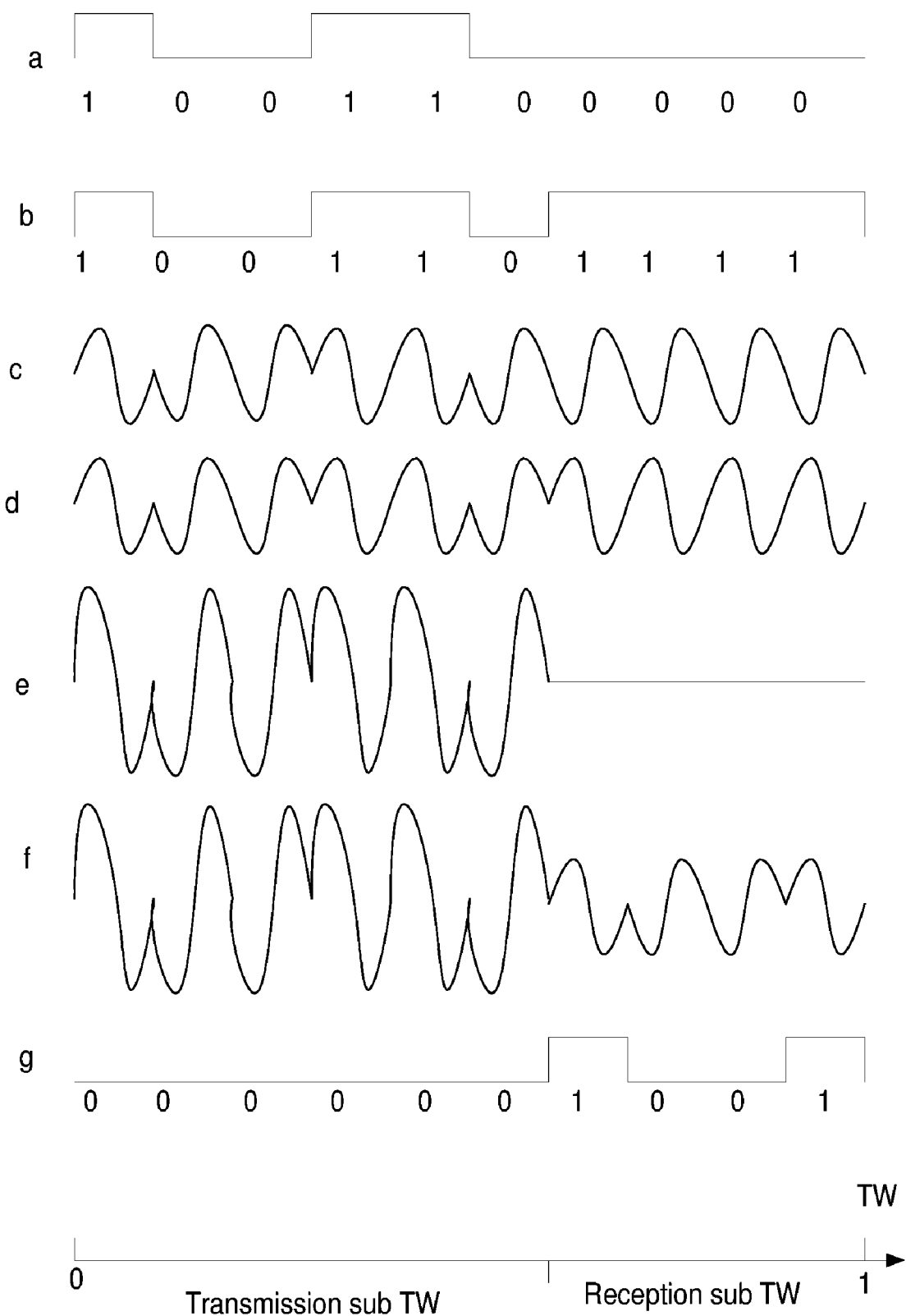
FIG. 10 shows a time diagram of operation of the transceiver that block diagram is shown on FIG. 9.

For described here case of wireless transmission system, FIG. 10 contains the time diagram that illustrates the reception (during sub TW of reception) and the transmission (during sub TW of transmission) data with the switching time equal zero. The time diagram shows flow of signals in several points of transceiver 90 in case of phase manipulation where every group includes one bit:

a—shows incoming from Converter 82 sequential signals (point a), which go to the Modulator 92 and to the Modulator 94 ether through 86 and 90 during transmission sub TWs or through 84, 88, and 90 during reception sub TWs, b—shows signals, coming to Modulator 94 (point b), c—shows outgoing from Modulator 92 signals (point c), d—shows outgoing from Modulator 94 signals (point d), e—shows outgoing from Adder 98 signals (point e), f—shows signals coming to the Demodulator 102 (point f), g—shows coming to the Converter 106 sequential signals (point g).

From this description, you can see that for transceiver 80 the switching time between sub TWs is the same as the transition time between adjacent signals in outgoing and incoming sequences. Thus, as in cases of copper and fiber optic transmission systems, in case of wireless transmission systems, the switching time can be decreased to zero.

Figure 11A:
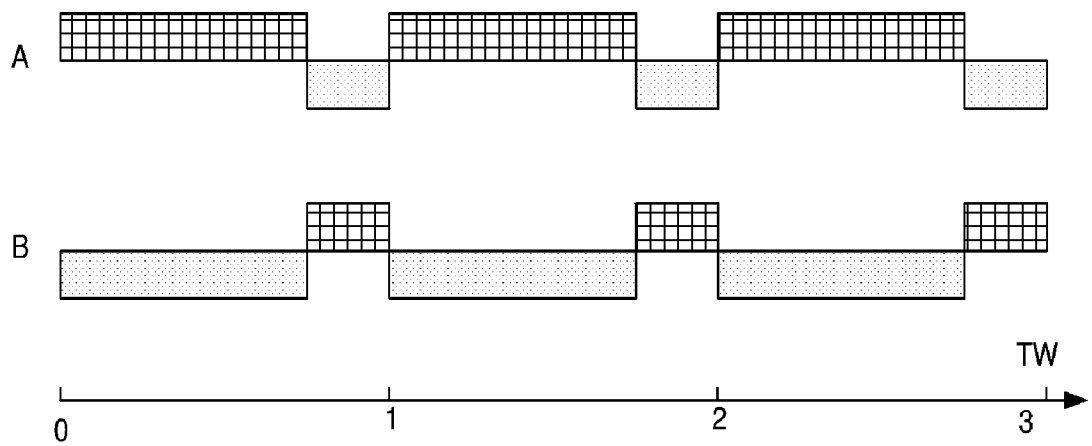
FIGS. 11a, 11b, and 11c show time diagrams of operations of "point-to-point" transmission system that uses disclosed in the main embodiment variation of the method for the distribution of transmission system's resources between directions equal 1:3 and different numbers of sub TWs in the TW (2, 4, 6).
Figure 11B:
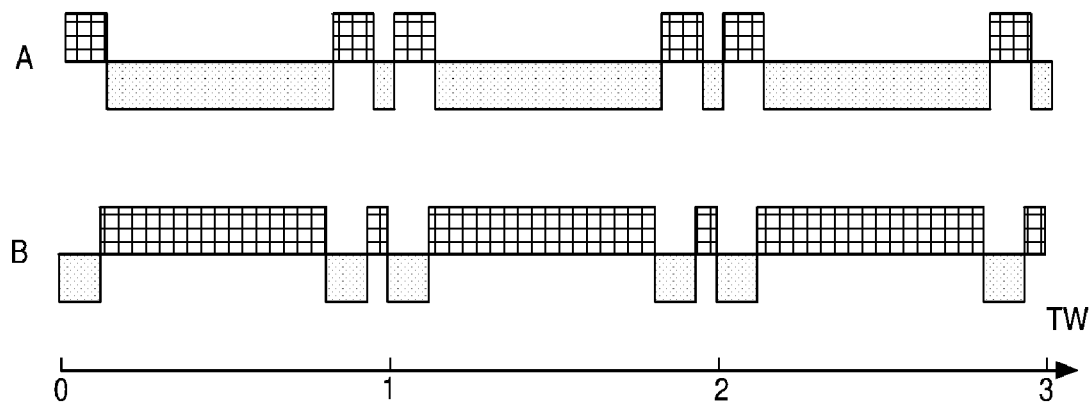
Figure 11C:
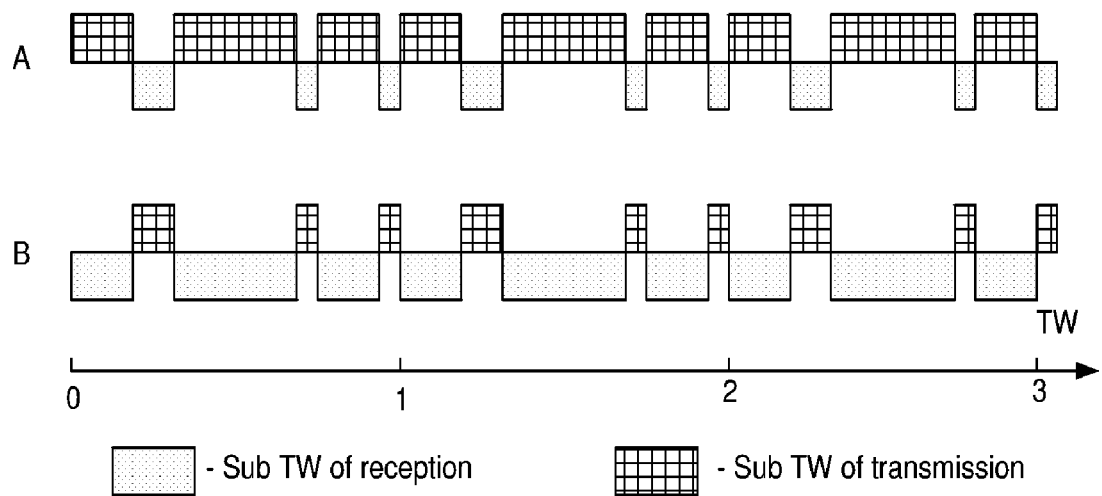

It makes the efficiency of the system independent of the number of sub TWs in the TW. This allows choosing for every situation the optimal distribution of transmission resources between directions. This allows also to choose the number, positions and sizes of sub TWs that improve other characteristics of transmission such as delay, size of buffer memory, synchronization, and other. FIG. 11 shows time diagrams of the transmission system that has different numbers of sub TWs in every TW (2, 4, and 6) but keeps the same distribution of transmission resources equal one to three. Offered in present invention method can work without tying bit synchronization to TW synchronization and without removing the switching time, however in this case, the transmission systems will lose significant part of their flexibility and efficiency.

Figure 12:
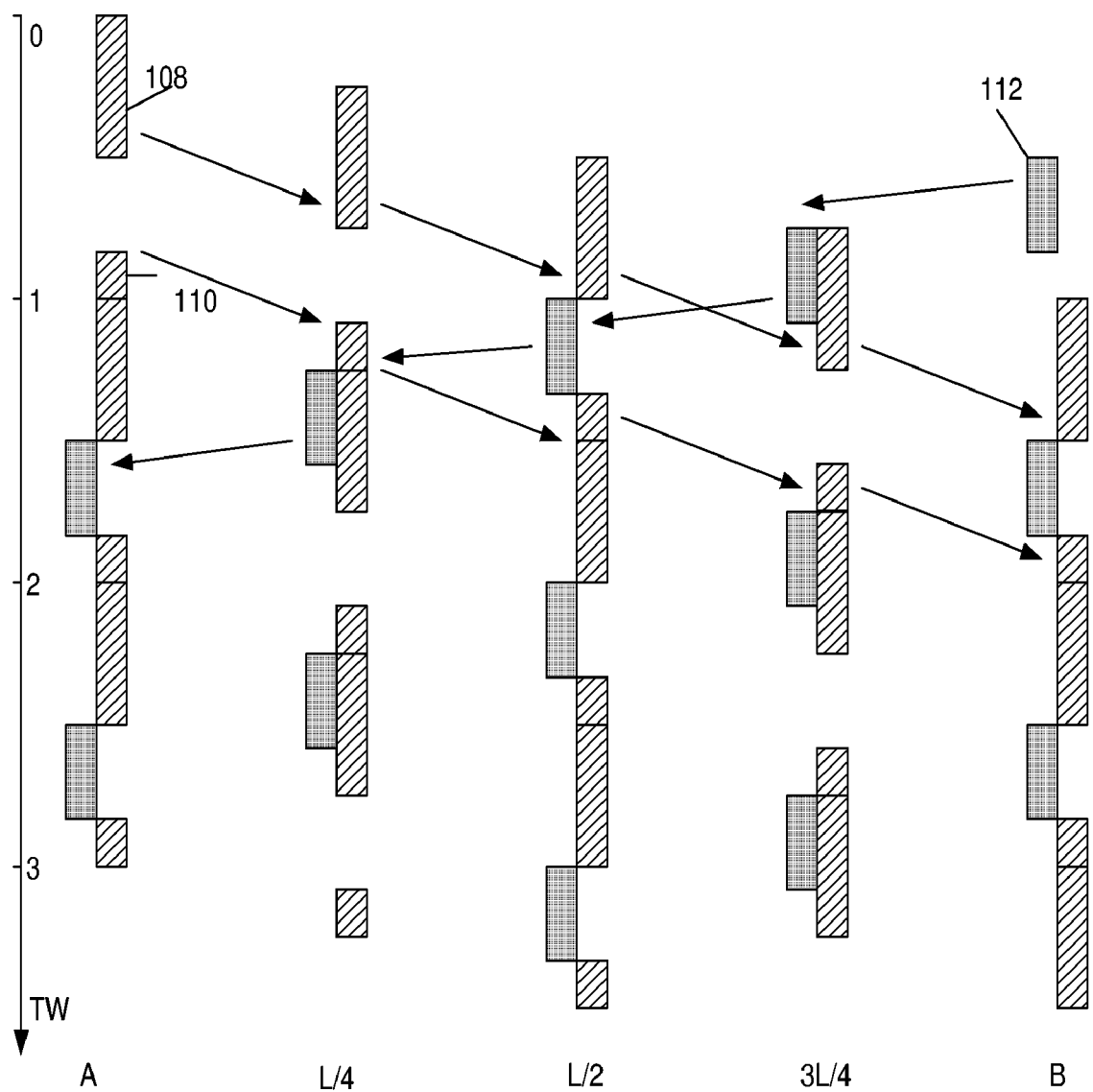
FIG. 12 shows a time diagram of a process of transmission the signals that takes place in several points of transmission line in case the transceivers operate using disclosed in the main embodiment variation of the method, which time diagram of operations presented on FIG. 3.

FIG. 12 depicts a time diagram of transmission signals in five points of the transmission line, which distances from one side (side A) are: 0 (A), ¼ L, ½ L, ¾ L, L (side B). During TW 0 from side A the transceiver sends signals in sub TWs 108 and 110. From side B the other transceiver sends signals during TW 0 in sub TW 112. As it follows from the diagram, in points A and B and in the middle of the line it is no interference between signals transmitted from both sides. In all other points of transmission line, the interference takes place. The absence of interference in the middle of the line allows to place there third transceiver, which can receive signals from both directions and send signals to two others in especially reserved for this communication sub TWs. By doing so, transmission resources of the transmission system can be flexibly and effectively redistribute among connections of these three transceivers. It is also possible to use the middle of the line to place a repeater that regenerates signals coming from opposite directions without interference that allows to increase the length of the transmission line. The repeater will introduce extra delay, which value depends on its characteristics.

Orders of Distribution

To promptly redistribute transmission resources between opposite directions, the transceivers have to fulfill versatile tasks that include communication with each other, gathering and processing statistical information regarding transmitted in both direction traffic, choosing parameters for optimal distribution the transmission resources. Alternatively, the transceivers can get information about changes in volume of data that are waiting for transmission in both directions from connected to them terminals and use the information for optimal redistribution resources.

Depending on conditions in which the transmission system will work, many rules of operations can be developed for the system. To give quantitative estimation efficiency of the described method and compare it with known methods, several possible orders of distribution transmission resources are developed. The analysis results of these estimation helps to compare efficiencies of the method and existing method used for two-way communications. Below three orders of distribution that are compatible with disclosed here method, are described:

Order of distribution 1: The transmission resources of the transmission system, allotted for transmission in opposite directions, are distributed between opposite directions evenly, when data sent through the transmission media in opposite directions simultaneously. When data are sent only in one direction, all resources are used for transmission data in this direction.

Order of distribution 2: The transmission resources of the transmission system, allotted for transmission in opposite directions, are distributed depending on statistical characteristics of data coming for transmission in opposite directions, when the transmission takes place in both directions simultaneously. When data are sent only in one direction, all resources are used for transmission data in this direction.

Order of distribution 3: The transmission resources of the transmission system, allotted for transmission in opposite directions, are distributed between opposite directions depending on volumes of data, waiting for transmission, when the transmission takes place in both directions simultaneously. When data are sent only in one direction, all resources are used for transmission data in this direction.

Using Order 1 transceivers need only send to each other information if they have data for transmission.

Using Order 2 transceivers need to have an ability to gather statistic about traffic sent in opposite directions and decide about long-term distribution during periods of transmission data in both directions.

Using Order 3 transceivers need to receive information from connected equipment about volumes of waiting for transmission data, exchange this information with other transceiver and decide about current redistribution.

For transmission system that operates according Order 1, estimation of an average time that data spend in the system was made in respect to the ratio of distribution the volume of data between directions of transmission for different data loads. Here the average time that data spend in the system equal the sum of the average time of transmission data through the transmission system and the average time the data are waiting for transmission.

The calculations were made for exponential distribution volumes of coming data and the data arrival process is Poisson process for both directions of transmission with values of utilization for opposite directions R1 and R2. For transmission system that operates according Order2 for the same conditions as in the previous case, the minimal value of the average time that data spend in the system is obtained. This value is achieved, when transmission resources of transmission system, allotted for transmission in opposite directions C=C1+C2, are distributed between directions in proportion C1/C2=(2−R2)/(2−R1), when data are sent in both directions simultaneously. However, when the data are sent only in one direction, all resources are used for transmission the data only in this direction. The results of calculations are compared, for the same characteristics of the data and characteristics of channels, with the results for method of two-way communication with separate channels assigned for transmission data in opposite directions, which used in most of current transmission systems. The estimations are made for values of combined utilization from both directions (R1+R2) equal 0.6, 1.2, and 1.8, and for distribution of the value of utilization between directions from 9.5/0.5 to 5/5.

Figure 13:
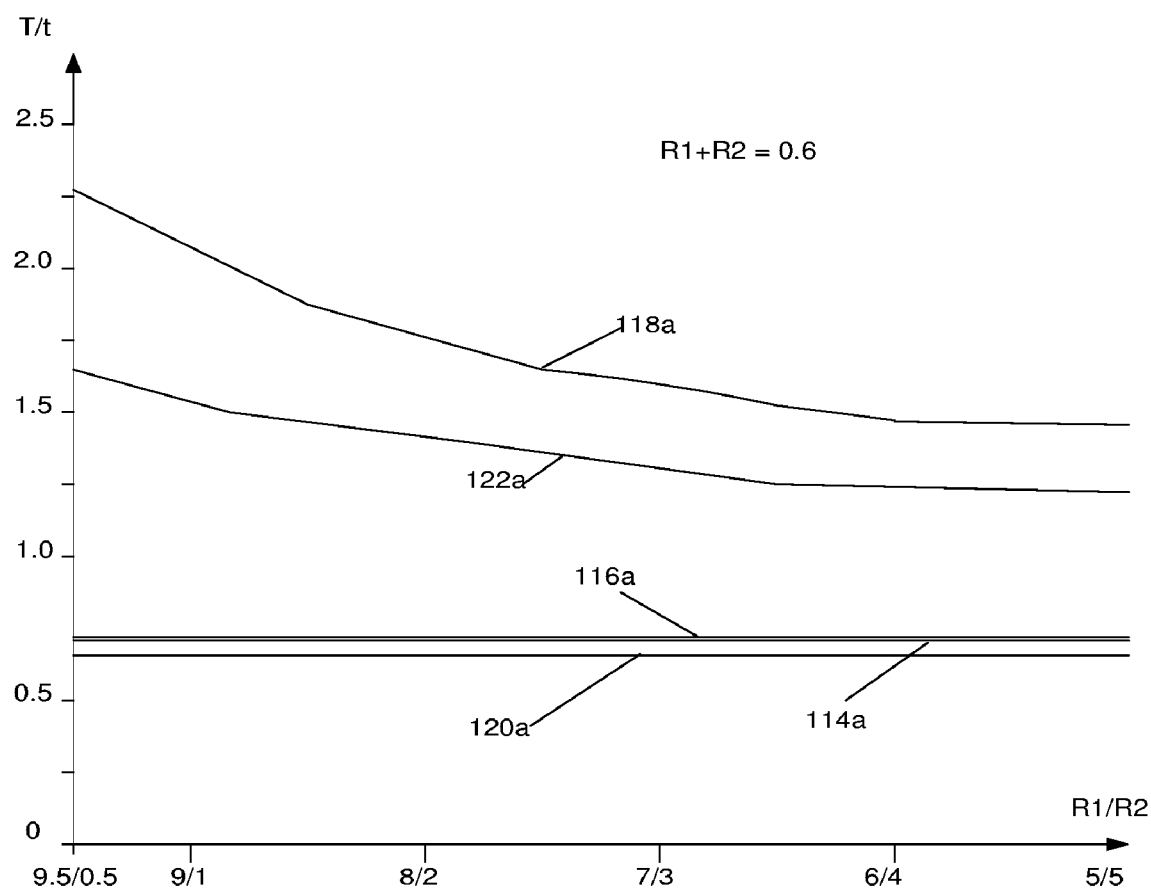
FIG. 13, 14, 15 show graphs that represent changes in the average time data spend in transmission system in respect to distribution the load between opposite directions for different operation modes and different values of incoming load (0.6; 1.2; 1.8).
Figure 14:
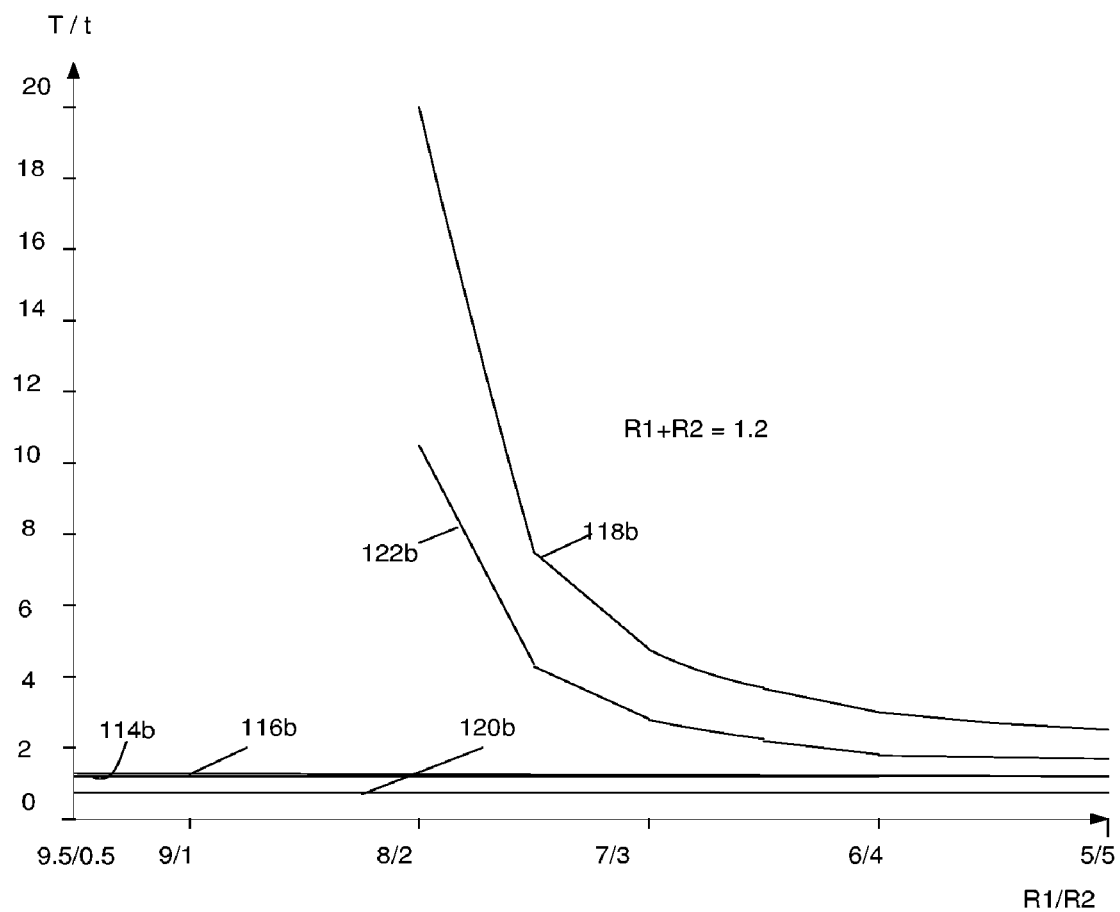
Figure 15:
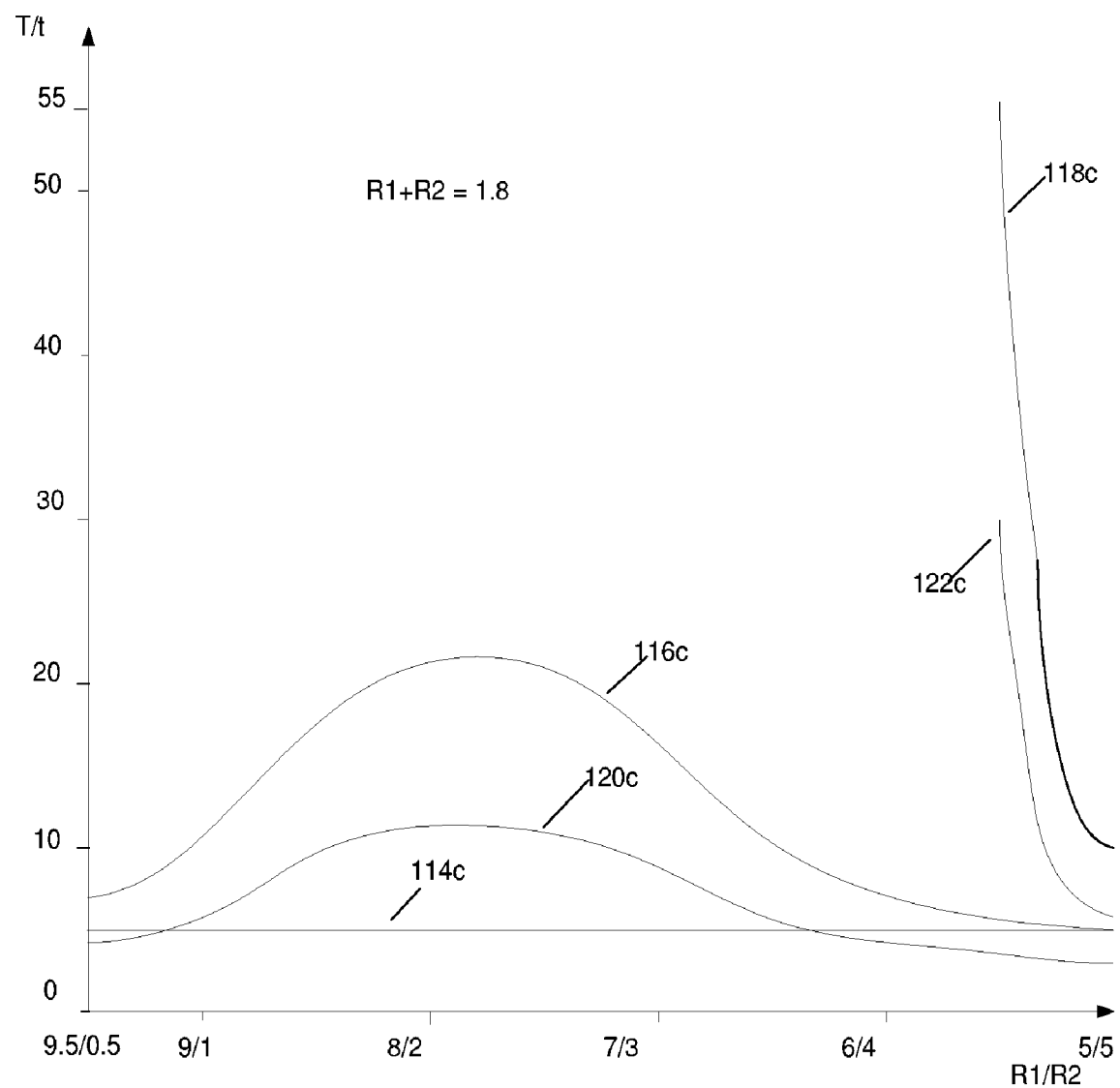

The graphs on FIG. 13-FIG. 15 represent the results of calculations of the average time data spend in the system for mentioned values of utilization correspondingly. On these figures, the average time data spend in transmission system is divided by the average time of transmission data through the transmission system for all cureves. The curves 126 *a, b*, and *c* on the figures belong to transmission system operated according to Order1; the curves 128 *a, b*, and *c* belong to transmission system with separate channels used for transmission in opposite directions. The graphs show that:

The transmission system build using method of present invention and operated according Order1 has better average time T than the one with separated channels for all distributions of utilization between directions, The transmission system build using the method disclosed in present invention and operated regarding Order1 limits the combine utilization (R1+R2<2) only, but when used the separate channels the limitations are made on the utilization in every direction of transmission independently (R1<1, R2<1). It means that for method described in present invention bigger range of the data can be sent through the system and all transmission resources always participate in the service.

On FIG. 13-FIG. 15 are shown also results of calculations of the average time T for the transmission systems described above, but in case when the data, sent through the system, have the permanent length equal to the average length of the exponential distribution used above. The matter is when data have permanent length, the average time T is the lowest among all distributions of the lengths of the data if the other conditions are equal. In the same time, in case of exponential distribution, average time T is high. Because of this, often the real traffic has the value of average time T somewhere between values for these two distributions (See James Martin, Systems Analysis for Data Transmission, 1972, pp 421-428). The curves 120 *a, b,* and *c* on the figures show results of calculations for transmission system operating according to Order1 and the curves 122 *a, b,* and *c* show results for the transmission system with separated channels for transmission in every direction for case of permanent value of the data lengths. From graphs, it is clear the difference between curves 116 and 120 is less than between curves 118 and 122 for all values of utilization. This means that for offered method the average time T has weaker dependency on the law of distribution the lengths of data than for method of transmission data in opposite direction through independent channels. For the transmission system that operates according to Order 2 on FIG. 13-FIG. 15 are shown curves 114 *a, b,* and *c*. These curves represent the relationship between the values of average time T and distribution of transmission resources between opposite directions. In this case, the value of average time T is independent of the distribution of transmission resources between directions. On Figs curves 114 *a, b,* and *c* represent lower values of T than curves 116 *a, b,* and *c* that reflects better performance of system operating according to Order 2 than operating according to Order 1.

If transmission system operates according to Order 3, the better results than in case of operation according to Order 2 are expected. It is because in case of operation according to Order 3 transceivers for redistribution transmission resources use the real time information about volumes of data waiting for transmission from both sides. In contrast to this, the systems operating according to Order 2 use statistical characteristics. Therefore, depending on used in transmission systems Order of distribution, the values of the average time T will be different. However, in all three cases the values of average time T are lower for offered in present invention method than in case of method used separate transmission resources for transmission data in opposite directions, which used in current transmission systems.

Figure 16:
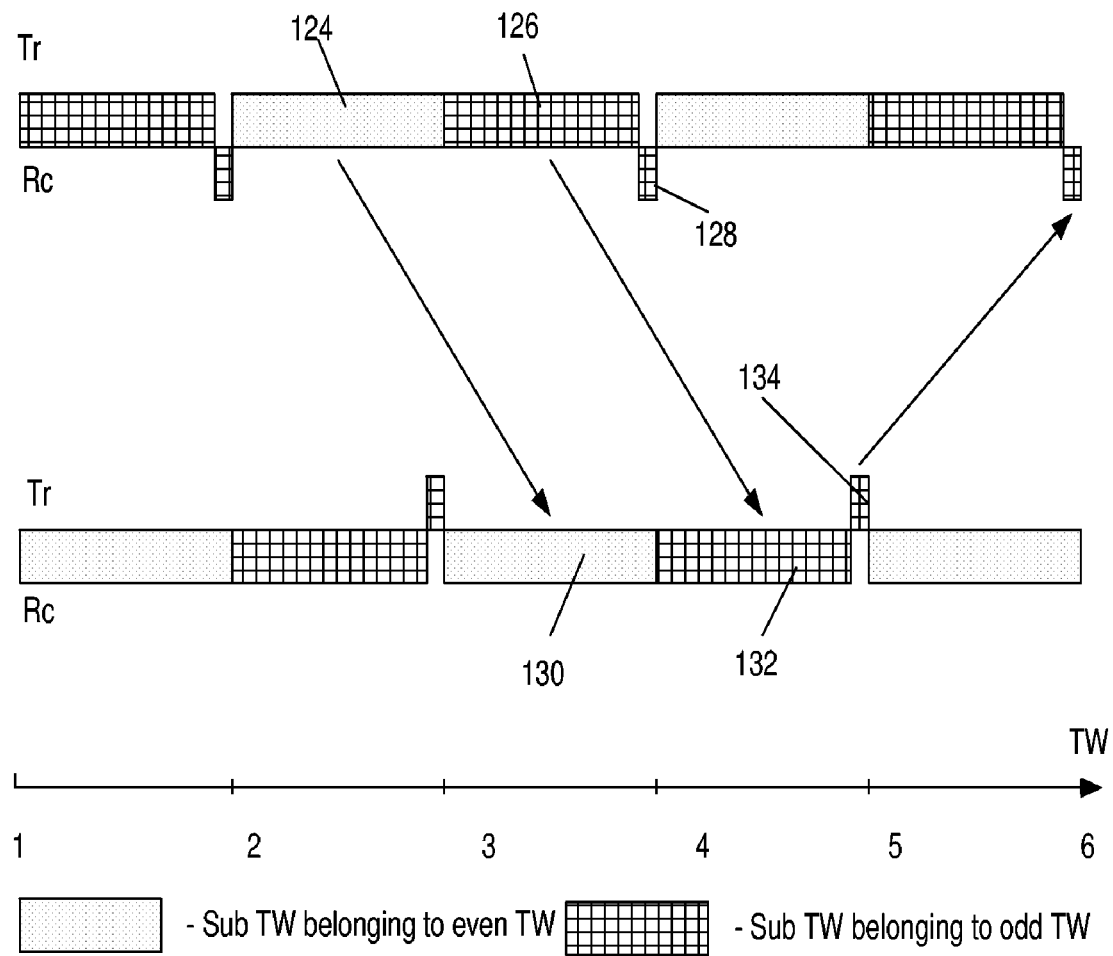
FIG. 16 shows a time diagram of "point-to-point" transmission system operating using disclosed in the additional embodiment variation of the method.
Figure 17:
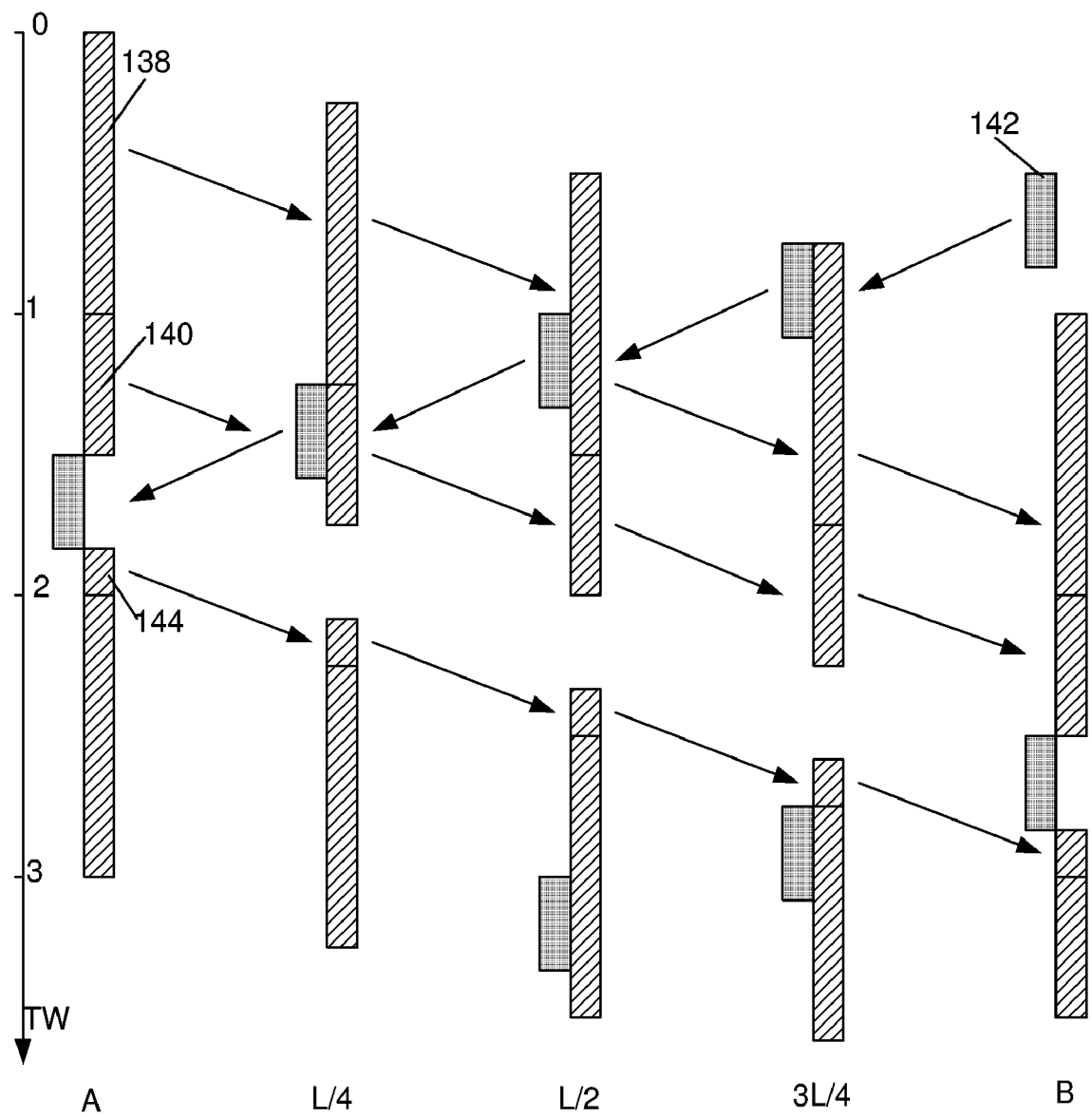
FIG. 17. shows a time diagram of process of transmission signals that takes place in several points of transmission line in case the transceivers operate using disclosed in the additional embodiment variation of the method.

FIGS. 16 and 17

Additional Embodiment

The method described in main embodiment uses the lengths of sub TWs that all together are lower than the length of T. The additional embodiment uses different patterns of dividing TWs into sub TWs for odd and even TWs. This allows increasing the interval for continuous transmission data in one direction to almost two times. FIG. 16 represents a time diagram that explains this additional embodiment. On the FIG TWs with even and odd numbers, have different from each other patterns of distribution TWs among sub TW. The distribution of TW 1 is different from the distribution of next TW 2 and same as the distribution of TW 3 for both sides of transmission system. By choosing appropriate patterns of distribution odd and even TWs, it is possible to increase the number of bits sent in one direction without interruption. It is possible if during the last sub TW of one TW and the first sub TW of next TW transmit data in the same direction.

On FIG. 16 sub TW 124 that belongs to TW2 and sub TW 126 that belongs to TW3 both used to send data from side A. Here transmission takes place for an interval bigger than the length of the TW. On the side B they are received in two sequential sub TWs 130 and 132. This embodiment provides also possibility to have only one sub TW 128 used to receive data for two consecutive TWs: TW2 and TW3. Data that sent in sub TW 134 of TW 4 are received in sub TW 136 of TW 5 on the opposite side. At list in two cases, described in this embodiment variant of the method will be helpful. At first, when it is advantageously, to increase the range of possible distributions of transmission resources between directions and, second, to reduce the number of changes directions of transmission, especially, if the switching time is countable.

FIG. 17 depicts a time diagram of propagation signals sent from opposite sides of transmission line during sub TWs 138, 140, 142, and 144 in five points of length L transmission line. The distances are 0, ¼ L, ½ L, ¾ L, L from the A side. As it follows from the diagram, if used two different patterns of distribution TWs, no interference is exist between signals transmitted from both sides only in points A and B. In all other points of the transmission line, the interference takes place.

FIG. 18

Alternative Embodiment

Figure 18:
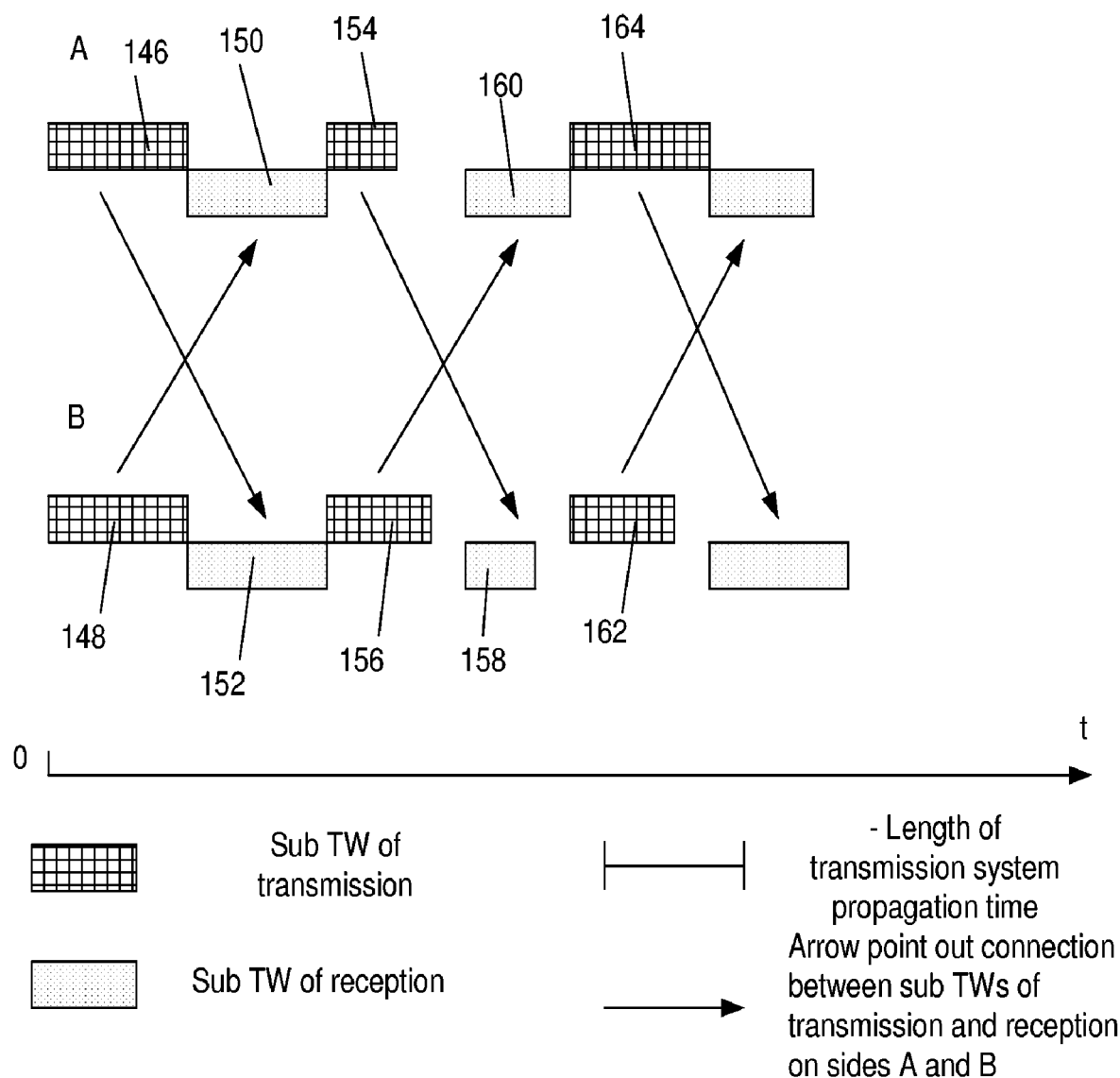
FIG. 18 shows a time diagram of "point-to-point" transmission system operating using disclosed in the alternative embodiment variation of the method.

The other embodiment of present invention describes third variation of the method of distribution the transmission line's resources between directions. Here during one TW both transceivers transmit data simultaneously and during the next TW they receive these data from each other. FIG. 18 depicts the time diagram of operations the transmission system that uses described in this additional embodiment variation of the method. On the FIG. during TW 146 and TW 148, the data are sent in opposite directions simultaneously. During TW 150 and TW 152, these data are received on the opposite sides simultaneously. Sometimes the times of transmission data in both directions are shorter than the transmission line's propagation time. In this case, the next TWs that can be used for transmission will start at once after reception data by both transceivers. This is possible because on both sides transceivers will know the length of data sent in opposite directions during every TW. On the FIG. the times of transmission data in opposite directions during TW 154 and TW 156 are shorter than the propagation time of the transmission line. Then the lengths of reception intervals 158 and 160 are shorter than the propagation time. Because of this, transmission of data in TW 162 and TW 164 starts immediately after data in the interval 160 are received. For this method, the time between two consecutive moments of beginning transmission is equal to the propagation time of the line and the longest time of transmission data sent in opposite directions simultaneously. This variation of method can be useful at least for transmission streams of data required transmission time shorter than the transmission line's propagation time.

FIG. 19

Additional Embodiment

Flexible and effective distribution of transmission system resources can be fulfilled not only by distributing sub TWs of TWs for transmission data in opposite directions. It can be done also using principles of code division multiplexing. In case of code division multiplexing a plurality of orthogonal polynomials represents information channels that are used for transmission data from several sources through the common physical channel simultaneously. In case of binary polynomials, each of them represents 1 as a special sequence of bits transmitted through the channel. The value 0 is represented by sequence of bits obtained from the sequence represented 1 by substitution every bit of the sequence for the opposite: 1 for 0 and 0 for 1. The stream of 1-ns and 0-os transmitted as stream of represented them sequences. The plurality of the sequences, every of which is represented 1 or 0 from different sources, is transmitted simultaneously through the common physical channel. On the opposite side of the transmission system, signals represented all these sequences are received by plurality of units every of which filters one special sequence, using the fact that the sequences are orthogonal. The number of bits represented every sequence of the plurality is the same, and it defines the maximum number of orthogonal sequences. For code division multiplexing, the number of these sequences represents the transmission resources of the transmission system. The transmission system will work properly if all sent sequences come to receiving side simultaneously. For transmission signals in opposite directions simultaneously, this condition has to be carried out on both sides of transmission line. In other words, on both sides of transmission line, the beginnings of transmission and reception signals have to coincide. Because of this, it is possible successfully transmit simultaneously and continuously streams of the orthogonal sequences in both directions if beginning of transmission sequences on both sides of transmission system coincide. Herewith the sequences sent in opposite directions have to be different members of the same plurality of orthogonal polynomials. By dividing the plurality of the sequences in two disjoint groups and by applying them for transmission in opposite directions, the transmission resources can be divided between directions in proportion to the number of the sequences in every of groups. In this case, the transmission resources will be redistributed by changing the numbers of the sequences in the groups.

Figure 19:
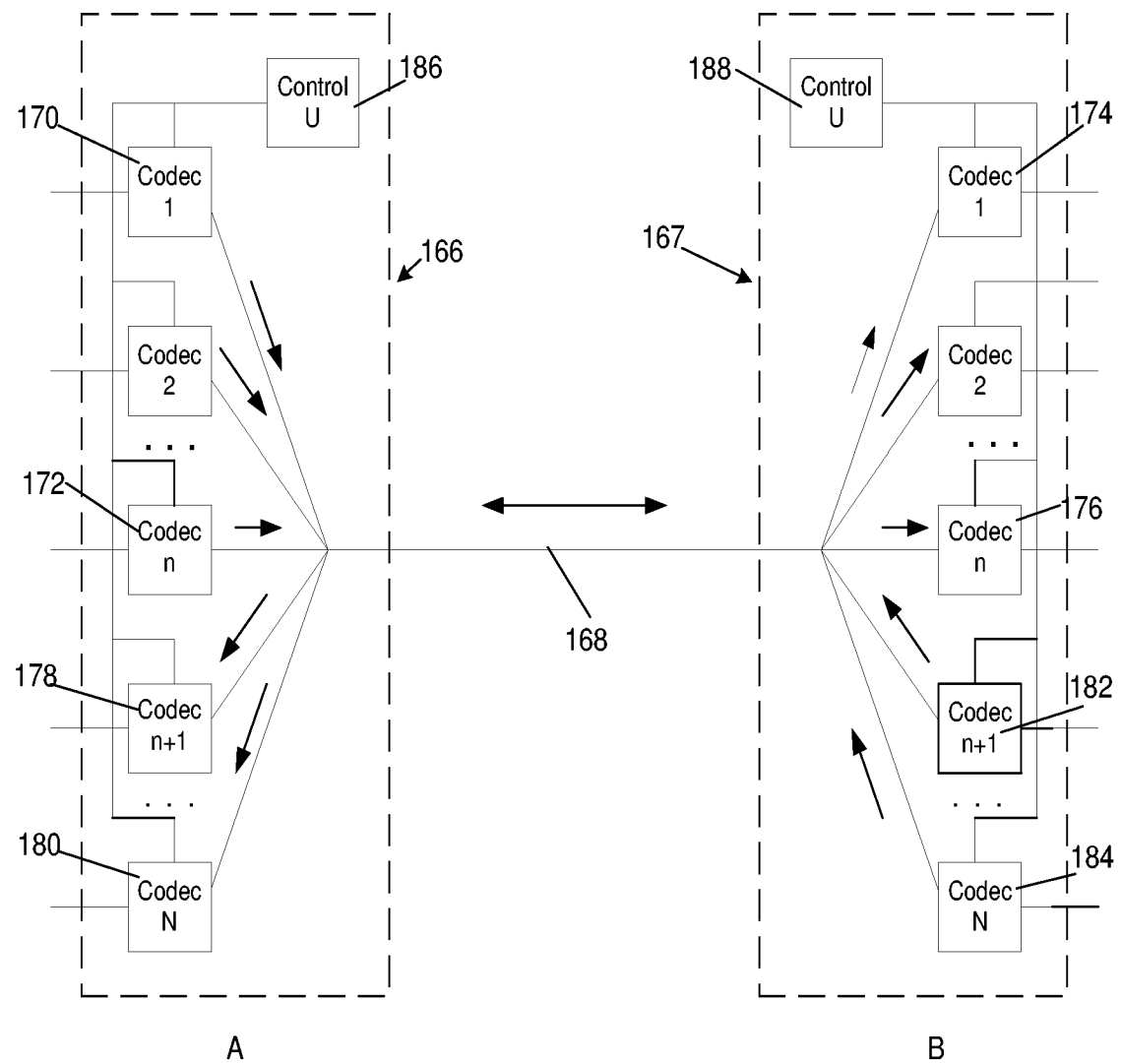
FIG. 19 shows a time diagram of "point-to-point" transmission system operating using disclosed in the second additional embodiment variation of the method.

As was underlined before, for this method to work correctly, the transceivers have to synchronize transmission signals. By dividing time of operations both transceivers in synchronized sequences of TWs and tying both the bit synchronization and the synchronization of orthogonal polynomials to synchronized sequences of TW, the requirement of synchronized transmission sequences will be fulfilled. Having higher noise-immunity, code divisions transmission systems can be used for transmission data in situations, where level of noise makes it impossible to use systems with time division. FIG. 19 shows block diagram of the transmission system that uses described in present invention method with code division for data transmission and redistribution transmission resources between opposite directions. On the FIG transceivers 166 and 167 are connected by transmission line 168. Every transceiver includes N Codecs that can be configured for transmission or reception one of the plurality of orthogonal sequences. Assigned for transmission data in one direction (from side A to side B) group consisting of n1 codecs placed on the FIG between codecs 170 and 172 on side A and between codecs 174 and 176 on side B. For transmission data in opposite direction (from side B to side A) is assigned group consisting of n2=N−n1 codecs placed on FIG between codecs 178 and 180 on side A and between codecs 182 and 184 on side B. Control units 186 and 188 can reconfigure any of Codecs in transceivers from transmission to reception or vice versa and, by doing so, redistribute the resources of transmission system between directions.

FIGS. 20 to 23

Additional Embodiment

This embodiment applies method of building flexible and effective "point-to-point" transmission systems described earlier to "point-to-multipoint" transmission systems. These systems are transmission systems where one, so-called, base station communicates with a plurality of, so-called, user stations. The user stations are usually allocated randomly and distances between the base station and every of the user stations, in general, are different. The location of every user station specifies values of two characteristics of transmission line: its propagation time and its loss of power.

In "point-to-multipoint" transmission systems, mostly cellular, PCS, and WLL (wireless local loop) the dependency the distance between the base station and user station on loss of power of transmitted signals is taken into account by choosing different levels of transmission power of the user station transceivers. Herewith the transmission rate, used for communications with any user station, is substantially the same. For build so transmission systems, the developed and described for "point-to-point" method cannot be used since it requires that transmission will be organized in TWs, the size of which are defined by the length of transmission line. As it mentioned before for different user stations these lengths are not coincide and TWs for every of them will be not of the same size.

One way of applying developed method to the "point-to-multipoint" transmission system consists in representing it as a plurality of "point-to-point" systems controlled by single management system. All these "point-to-point" transmission systems can use different lengths of TWs and in this case the method can work for every of them. This can be carried out in both code division and time division. Implementation of the method allows flexible distribute and redistribute the transmission resources of every "point-to-point" transmission system between opposite directions and because of this, more effectively utilize transmission resources. The transmission rate can be chosen for every connection between the base station and the user station independently. This leads to better distribution transmission resources of "point-to-multipoint" transmission system among existing simultaneously "point-to-point" connections. Therefore, this technical solution makes possible the utilization of both marked dependencies to create effective and flexible point-to-multipoint transmission system.

For every transmission media, the correlation between the loss of power and the distance is different. For terrestrial and satellite microwaves, the loss of power are proportional to the square of the distance between transceivers. In case of cellular networks working in urban environment, usually the loss is nearly proportional to the distance on the power of somewhere between 3 and 4 (See Roy Blake, Wireless Communication Technologies, 2001, pp 226-228 and 235-237). In digital transmission systems, it is conventional to estimate the performance of the link in noisy environment by the characteristic called energy per bit per noise density. This characteristic is used to compare performance of cellular systems for different distributions user stations inside the cell. If this ratio is bigger than 10-20 dB (the difference because of different types of receiving devices), it is usually enough to support bit error rate of $1/10,000$. This error rate is considered acceptable for wireless systems (See Roy Blake, Electronic Communication Systems, 2nd edition, 2002 pp 682-683). To support this level of errors for all connections, it is enough to keep permanent value of the product of the power in the receiving point and the time of transmission of one bit under condition that the value of noise density will be constant. The time of transmission of one bit is back proportional to the transmission rate. Therefore, to support the same probability of errors for all connections with user stations removed from the base station on different distances, there are three choices:

can be changed level of signal,
can be changed transmission rate,
can be changed both of them.

Most of existing cellular networks use first of these choices. However, IEEE 802.16, the standard for WLL, offers, depending on the length of transmission lines, 3 different types of modulation that allow to transmit 6, 4, and 2 bit/baud. That defines 3 transmission rates 150 Mbps, 100 Mbps, and 50 Mbps. According to this standard, to transmit the same volume of data, user stations need different time depending on their locations. Applying different transmission rates depending on the distances allows improving utilization transmission resources. By choosing transmission rate independently for every connection when providing equal quality of transmission for all connections, the system will provide service for more user stations than in case of using one transmission rate for all connections. Because the difference in loss of power is bigger for cellular networks than for WLL for different distances, the gain of implementation different transmission rates will be higher for cellular systems.

To estimate the efficiency of cellular networks because of implementation different transmission rates for connections with user stations removed from the base station on different distances, the calculations are made. Because the number of available for serving the user stations resources depends on the distribution of density user stations inside the cell area, here are used two cases. First case, when the density was constant inside the cell area. Second case, when it was distributed back proportional to the distance from the base station. The results of calculations compared with the case when channels with only one transmission rate are used for all connections inside the cellular network. The results show that in case of even distribution density inside the cell area the base station can serve 2.29 times bigger number of user stations than in case when all channels have the same transmission rate. In case of back proportional distribution of density, achieved gain is 3.46. Another gain 1.5-2 times is achieved by applying for every connection the method of flexible distribution resources between opposite directions. With regard to this, the estimated gain for even distribution density is between 3.4-4.5 times and for back proportional distribution of density the gain is between 5.1-6.9 times. For cells where density of user stations decreases faster than back proportional with increase of the distance from the base station, the gain will be bigger and vice versa.

With the intent to increase the efficiency and flexibility of the cellular networks by applying described in present invention methods, below are developed several basic technical and architectural propositions for building the "point-to-multipoint" transmissions system:

The operating time of transmission system has to be divided into intervals (TI). The length of the TI has to be equal to the time of propagation signals between the base station and the user station located on the border of the cell. Several consecutive TIs form a time frame (TF). For different cells, the value of TI can be different. Every TI has to be divided into several sub TI, For every connection, the system assigns resources called here connection interval (CI). The size of the interval depends on the location of user station and the level of noise. Every CI is described by three parameters: TI number, sub TI number, and number of sub TIs during which data are sent, For every CI has to be assigned an integer number of sub TIs. If it is necessary, the length of CI can be changed, The transmission rate for every connection is chosen depending on the time of propagation for this connection and level of noise density. The transmission rate used in opposite directions of one connection can be different, The size of CI and the transmission rate for every connection are chosen so that the volume of data sent during CI stay the same for any location user station inside cell, Every CI is divided into TWs that used by transceivers to send data in opposite directions simultaneously and to distribute and redistribute transmission resources between opposite directions, For mobile user stations during connections, with changes of the distance to the base station, the propagation time will change too. By measuring changes on both user and base stations the values of the TW and transmission rate can be automatically adjusted without interruption of the connection, To decrease the number of handoffs for mobile user stations when they crossed the borders between cells, a special base station with coverage area equal to areas of several regular base stations is used. This special base station can be used not only for serving mobile user stations but also to support connections in regular cells, when the base stations are out of order, or when some base stations are overloaded, For data transmission the base station and the user station communicate for temporarily increase the size of the Connection Interval. This allows every time achieve both: transmit data on the highest for every connection transmission rate and for the best distribution of transmission resources among all existing simultaneously connections.

Figure 20:
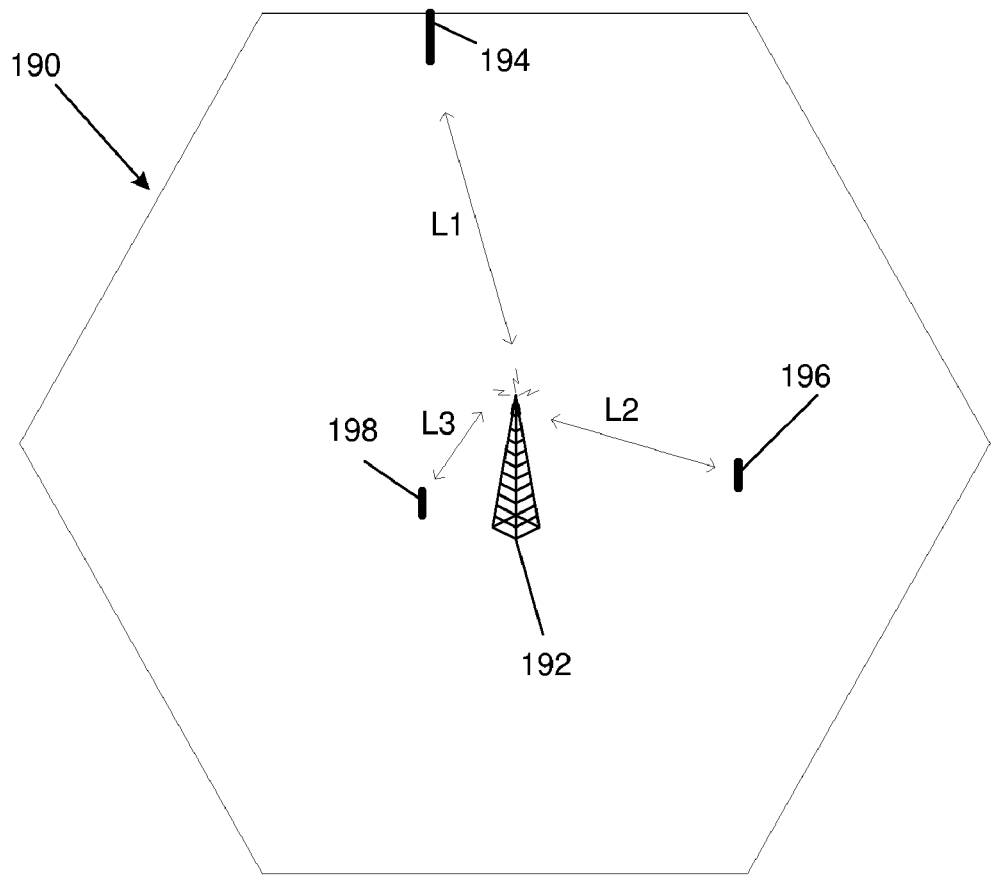
FIG. 20 shows a structure diagram of "point-to-multipoint" transmission system used the disclosed method of building transmission systems.
Figure 21:
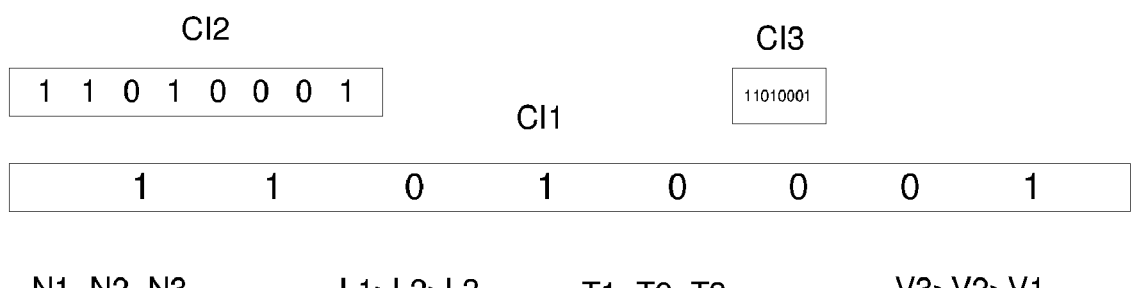
FIG. 21 shows the connections intervals for depicted on FIG. 20 locations of three user stations.

FIG. 20 shows cell 190, where base station 192 communicates with 3 user stations. The user stations are removed on different distances from the base station. User station 194 is on the border of cell. User station 196 is somewhere in the middle between the base station and the border. User station 198 is somewhere in the closer to the base station area. For connections with these 3 user stations 194, 196, and 198, on FIG. 21 are shown CIs. From FIG. you can see the difference in length of CIs and corresponding transmission rates in respect to the lengths of transmission lines. For example, if the ratio of distances to base station 192 from user stations 198 and 194 equals to 1:4, the ratio of biggest transmission rates for communication base station 192 with user stations 198 and 194 will be in range between 64 and 256.

Figure 22:
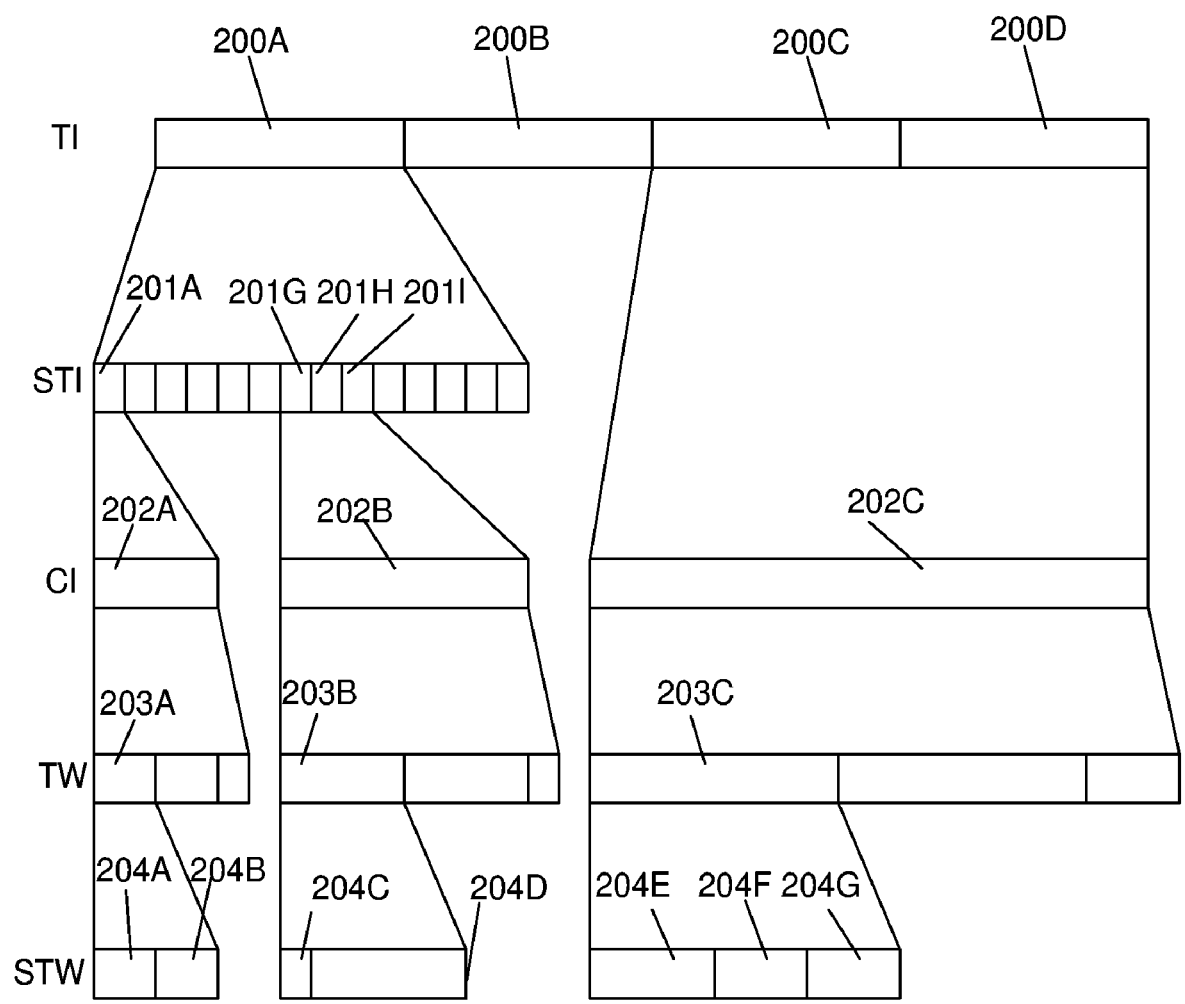
FIG. 22 illustrates the relationships among time intervals, sub time intervals, connection intervals, time windows, and sub time intervals in "point-to-multipoint" transmission system.

FIG. 22 illustrates the relationships among TI, sub TI, CI, TW, and sub TW. Here sequence of TI 200A, 200B, 200C, and 200D divided into equal length sub TIs 201A, 201B and so on. One or more sub TI or even one or several TI can be assigned for every CI, depending on the distances between the base station and the user stations and volumes of data that have to be sent. On the FIG. one sub TI 201A is assigned for CI 202A, 3 sub TIs 201G-201I assigned for CI 202B, and 2 TIs 200C and 200D assigned for CI 202C. Inside every CI transmission is carried out inside TWs. The lengths of transmission lines, when other conditions of transmission are equal, define the sizes of TWs. Because of this, the sizes of TWs in different CIs will be different. On the FIG. TWs 203A, 203B, and 203C belongs to different CIs and have different sizes. It is not necessary that the size of any CI is equal to integer number of its TWs. Every TWs in turn can be divided into several sub TWs that used to send data in opposite directions. For example, TW 203A of CI 202A consists of two sub TWs 204A and 204B that used to send data, belonging to connection between the base station and one of user stations, in opposite directions. Similarly, TW 203B consists of two sub TWs 204C and 204D, and TW 203C consists of three sub TWs 204E, 204F, and 204G. The amount of data sent during TW in opposite directions determined by traffic coming for transmission in both directions.

Figure 23:
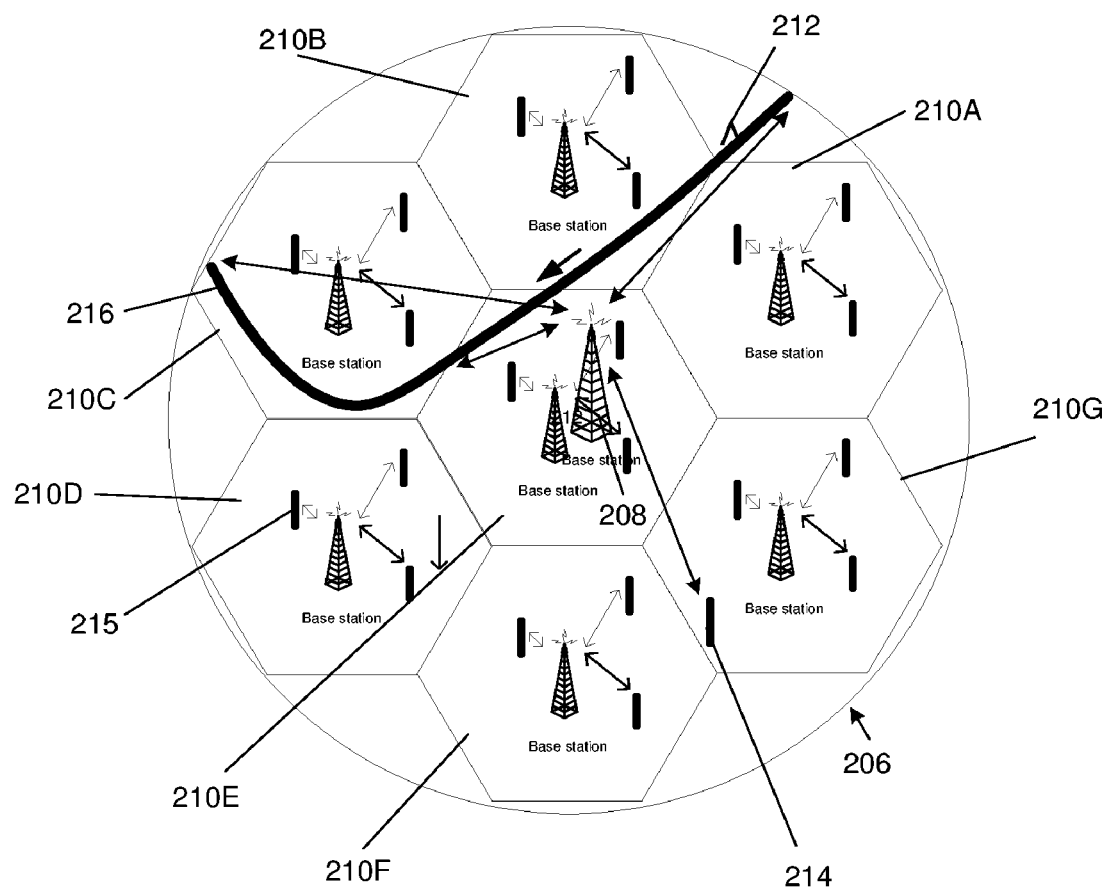
FIG. 23 shows fragment of cellular network including seven regular cells and one cell with big covered service are for serving mobile user stations.

FIG. 23 shows an area, covered by 7 regular cells 210A-210F and by cell 206. The regular cells serve non-mobile user stations, as for example 218, inside their cells. Cell 206 with its base station 208 serves mobile user stations, like 212, when their routes, like 216, go through cell's 206 area. The base station 208 can serve also non-mobile user stations like 214 located in the area of service when base station of regular cell cannot serve them.

Described here method of building flexible and effective "point-to-multipoint" transmissions system has several advantages:

It opens the way for applying proposed in present invention method of building flexible transmission systems to every connection of "point-to-multipoint" transmissions system. Both time division and code division can be used here for every connection during every Connection Interval (CI) in the same way as it was described for "point-to-point" transmission systems. It is possible for some connections, inside their CIs, to use time division and for other ones, inside their CIs, to use code division, It allows choosing the best combination of transmission rate and power for every connection depending on the distance between the user and the base stations and required error level; the combination can be adjusted when the distance or error level is changed, It allows effective utilization of "point-to-multipoint" system's transmissions resources by assigning for every connection the length of CI and the transmission rate depending on the location of the user station inside the cell, It keeps open door for new methods of transmission data, supporting easy way of implementation new means of communications in working "point-to-multipoint" transmissions systems, It allows serving differently mobile and non-mobile user stations and, by doing so, simplifies the tasks of control system and decrease the number of handoffs.

CONCLUSION

From disclosed in presented above material, you can see that described method of building transmission systems allows building systems that unlike others transmission systems used for two-way communications combine both high flexibility and high efficiency. This combination helps in some cases to free part of transmission resources such as frequencies, fibers, pairs of copper cable that used currently by transmission systems. In other cases, this combination helps to extend the range of loads that can be served by the system and increase its reliability. The method is universal and can be applied to wireless, fiber optic, and copper cables transmission systems.

The method gives a unique opportunity to create power-saving transmission systems that during periods of low traffic can reduce consumption of energy. This opportunity is especially important for undersea, satellite, and different mobile transmission systems, although it can be useful for any transmission system.

The method can be implemented in transmission systems used in local loop, trunks between Central Offices, long-distance, and international transmission systems. It can be applied to the Internet, Public Telephone Networks, to Cable Television Networks, to Cellular and PCS Networks, and to Wireless Local Loops.

As it was underlined before, the scope of the invention has to be determined only by presented claims that are an integrated part of the patent specification.

What is claimed is:

1. A method of building transmission systems comprising of:
   (a) providing a transmission media that possess an ability to propagate signals from one end to the other for the time, which depends on its length and material,
   (b) providing two identical devices called transceivers connected to opposite ends of said media to send said signals to each other, and every of which is operable for performing acts of:
      (1) representing its operation time, which is defined here as time when any signal sent by said transceivers is propagated through the transmission media, as a sequence of time intervals, every of which has a length equal to the time of propagation of said signals through said transmission media and called here Time Window, and
      (2) synchronizing its said sequence with the sequence of the Time Windows of the other said transceiver so that beginnings of said Time Windows in said transceivers coincide, and
      (3) dividing said Time Windows into plurality disjoint sub Time Windows, and
      (4) assigning some of said sub Time Windows for transmission and assigning some other of them for reception, and
      (5) establishing a correlation between said sequences, regarding which positions relative to the beginning of said Time Window and said lengths of all said sub Time Windows assigned for transmission in said Time Windows of one said sequence have to respectively correspond with said positions and said lengths of said sub Time Windows assigned for reception in the next said Time Window of the other said sequence,
   whereby said method eliminates the influence of the propagation time on the efficiency of use resources of said transmission system and in the same time provides an opportunity of flexible distribution said resources between opposite directions.

2. The method of claim 1 further including an ability of choosing transmission rates for opposite directions of transmission independently, based on the parameters of said transmission line, the required quality of service, the levels of noise, and also on condition that an integer number of bits have to be transmitted for said Time Window and every said sub Time Windows,
   whereby can be established, not sensitive to changes said directions of transmission and locked to said length of said Time Window, bit synchronization that contributes to higher said efficiency than in case when reestablishing said synchronization is necessary after every said change of said direction of transmission.

3. The method of claim 1 wherein said transceivers are able to perform operations comprising of:
   (a) generating a plurality of signals including one with power equal approximately zero for transmission through said transmission line, and
   (b) switching to said signal with power zero and after this sending it into said transmission line, during said sub Time Windows used for reception,
   whereby, as a result of using said signals with power zero, time of switching said transceivers from the transmission said signals to the reception said signals is eliminated.

4. The method of claim 3 further including an ability of choosing transmission rates for opposite directions of transmissions independently, based on the parameters of said transmission line, the required quality of service, the levels of noise, and also on condition that the integer numbers of bits have to be transmitted for said Time Window and every said sub Time Windows, whereby, by eliminating the influence of said propagation time, said switching time, and the need for reestablishing said bit synchronization every time when the direction of transmission is changed, achieves the best performance, and also, by locking said bit synchronization to the Time Window synchronization, it allows to keep said bit synchronization stable during possible fluctuations of said length of Time Windows.

5. The method of claim 4 wherein every said sequence includes said Time Windows, which have the same number of said sub Time Windows, lengths of every said sub Time Window, and positioning of said sub Time Windows inside said Time Window.

6. The method of claim 5, further including an ability comprising of:
  (a) providing third transceiver connected accurately in the middle of said transmission line and synchronized with other two said transceivers, and
  (b) using dedicated said sub Time Windows for communication said transceivers on both sides of said transmission line with said transceiver located in the middle of said transmission line,
whereby allowing redistribution said bandwidth of transmission system among three connected by fiber optic or copper cables transmission media transceivers without congestions and with the same level of efficiency and flexibility as in case of two said transceivers connected to opposite sides of said transmission line.

7. The method of claim 5, further including an ability of providing a repeater, which provides regeneration signals coming from both directions, and which is placed accurately in the middle of said transmission line and synchronized with two said transceivers,
  whereby allowing two times increase the length of said transmission line.

8. The method of claim 4 wherein every of said sequences comprising of:
  (a) providing for all odd said Time Windows one and the same inner arrangement of said sub Time Windows including number, length, and positioning relative to the beginning of said Time Window, and
  (b) providing for all even said Time Windows one and the same, but different from one that have odd said Time Windows, inner arrangement of said sub Time Windows.

* * * * *